(12) United States Patent
Bai et al.

(10) Patent No.: US 12,028,880 B2
(45) Date of Patent: Jul. 2, 2024

(54) BEAM INDICATIONS FOR MULTIPLE UPLINK OR DOWNLINK CHANNELS AND REFERENCE SIGNALS

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/140,817

(22) Filed: Jan. 4, 2021

(65) Prior Publication Data

US 2022/0217725 A1    Jul. 7, 2022

(51) Int. Cl.
*H04W 72/04* (2023.01)
*H04B 7/01* (2006.01)
(Continued)

(52) U.S. Cl.
CPC .............. *H04W 72/53* (2023.01); *H04B 7/01* (2013.01); *H04W 52/242* (2013.01);
(Continued)

(58) Field of Classification Search
None
See application file for complete search history.

(56) References Cited

U.S. PATENT DOCUMENTS

2020/0413469 A1\* 12/2020 Wu ...................... H04W 36/305
2021/0185647 A1\* 6/2021 Rahman .............. H04W 72/042
(Continued)

FOREIGN PATENT DOCUMENTS

WO    WO-2022083658 A1 \*    4/2022

OTHER PUBLICATIONS

FUTUREWEI: "Enhancement on Multi-Beam Operation", 3GPP Draft, R1-2007546, 3GPP TSG RAN WG1 Meeting #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020 (Oct. 23, 2020), XP051945273, 9 Pages, Retrieved from the Internet: URL: https://ftp.3gpp.org/tsg_ran/WG1_RL1/TSGR1_103-e/Docs/R1-2007546.zip R1-2007546.docx [retrieved on Oct. 23, 2020] p. 1-p. 6.
International Search Report and Written Opinion—PCT/US2021/061015—ISA/EPO—dated Mar. 18, 2022.
(Continued)

*Primary Examiner* — Kodzovi Acolatse
(74) *Attorney, Agent, or Firm* — Holland & Hart LLP

(57) ABSTRACT

Methods, systems, and devices for wireless communication are described. Generally, the described techniques provide for a user equipment (UE) to receive a message including transmission configuration indicator (TCI) states information associated with beam information for uplink or downlink resources. The UE may identify multiple channels or reference signals, or both, to which a TCI state is to be applied based on associated indications included with the TCI state information. In some examples, the TCI state information may also include indications of source reference signals for quasi co-location (QCL) assumptions for the indicated channels or reference signals. Based on applying the TCI state, the UE may determine beam information for uplink or downlink resources and may communicate with the base station accordingly.

33 Claims, 15 Drawing Sheets

(51) Int. Cl.
  *H04W 52/24* (2009.01)
  *H04W 52/42* (2009.01)
  *H04W 72/044* (2023.01)
  *H04W 72/21* (2023.01)
  *H04W 72/23* (2023.01)
  *H04W 72/53* (2023.01)

(52) U.S. Cl.
  CPC ......... *H04W 52/42* (2013.01); *H04W 72/046* (2013.01); *H04W 72/21* (2023.01); *H04W 72/23* (2023.01)

(56) References Cited

U.S. PATENT DOCUMENTS

| | | | |
|---|---|---|---|
| 2021/0314953 A1* | 10/2021 | Park | H04W 72/046 |
| 2021/0321373 A1* | 10/2021 | Rahman | H04W 72/0446 |
| 2022/0030480 A1  | 1/2022  | Kung | H04L 5/0053 |
| 2022/0104043 A1* | 3/2022  | Farag | H04B 7/0695 |
| 2022/0225370 A1* | 7/2022  | Park | H04L 5/001 |

OTHER PUBLICATIONS

Mediatek Inc: "Enhancement on Multi-Beam Operation", 3GPP Draft, R1-2008956, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946744, 16 Pages, Retrieved from the Internet: URL: https://ftp.3gpp.org/tsg_ran/WG1_RL1/TSGR1_103-e/Docs/R1-2008956.zip R1-2008956_MB_final.docx [retrieved on Oct. 24, 2020] p. 1-p. 6.

ZTE: "Enhancements on Multi-Beam Operation", 3GPP TSG RAN WG1 Meeting #103-e, 3GPP Draft, R1-2007763, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), 19 Pages, XP051946497, Retrieved from the Internet: URL: https://www.3gpp.org/ftp/TSG_RAN/WG1_RL1/TSGR1_103-e/Docs/R1-2007763.zip, R1-2007763 Enhancements on multi-beam operation.docx, [retrieved on Oct. 24, 2020], Sections 2.1.2 , 2.2.2, 2.2.3, 2.4, p. 1-p. 5.

* cited by examiner

BEAM INDICATIONS FOR MULTIPLE UPLINK OR DOWNLINK CHANNELS AND REFERENCE SIGNALS

FIELD OF TECHNOLOGY

The following relates to wireless communication, including beam indications for multiple uplink or downlink channels and reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support beam indications for multiple uplink or downlink channels and reference signals. Generally, the described techniques provide for a user equipment (UE) to receive a message including transmission configuration indicator (TCI) state information associated with beam information for uplink or downlink resources. For example, separate TCI state information may be indicated to the UE for uplink and downlink resources. The UE may identify multiple channels or reference signals, or any combination thereof, to which a TCI state is to be applied based on associated indications included with the TCI state information. The multiple channels or reference signals may include multiple uplink channel or reference signals, or the multiple channels or reference signals may include multiple downlink channels or reference signals, which may be based on the separate TCI state information provided to the UE. In some examples, the TCI state information may also include indications of source reference signals for quasi co-location (QCL) assumptions for the indicated channels or reference signals. Based on applying the TCI state to the multiple channels and/or reference signals, the UE may determine beam information for uplink or downlink resources and may communicate with the base station accordingly.

A method for wireless communication at a user equipment (UE) is described. The method may include receiving a message including first transmission configuration indicator state information and second transmission configuration indicator state information different from the first transmission configuration indicator state information, where the first transmission configuration indicator state information is associated with a set of multiple uplink resources and where the second transmission configuration indicator state information is associated with a set of multiple downlink resources, identifying two or more channels, or reference signals, or any combination thereof, to which a transmission configuration indicator state is to be applied, the two or more channels including two or more uplink channels indicated within the first transmission configuration indicator state information or two or more downlink channels indicated within the second transmission configuration indicator state information, where the transmission configuration indicator state corresponds to one or more source reference signals associated with QCL assumptions for the two or more channels, or the reference signals, or any combination thereof, and determining common beam information for the set of multiple uplink resources or the set of multiple downlink resources based on applying the transmission configuration indicator state to the two or more channels, or the reference signals, or any combination thereof.

An apparatus for wireless communication at a UE is described. The apparatus may include a processor, memory in electronic communication with the processor, and instructions stored in the memory. The instructions may be executable by the processor to cause the apparatus to receive a message including first transmission configuration indicator state information and second transmission configuration indicator state information different from the first transmission configuration indicator state information, where the first transmission configuration indicator state information is associated with a set of multiple uplink resources and where the second transmission configuration indicator state information is associated with a set of multiple downlink resources, identify two or more channels, or reference signals, or any combination thereof, to which a transmission configuration indicator state is to be applied, the two or more channels including two or more uplink channels indicated within the first transmission configuration indicator state information or two or more downlink channels indicated within the second transmission configuration indicator state information, where the transmission configuration indicator state corresponds to one or more source reference signals associated with QCL assumptions for the two or more channels, or the reference signals, or any combination thereof, and determine common beam information for the set of multiple uplink resources or the set of multiple downlink resources based on applying the transmission configuration indicator state to the two or more channels, or the reference signals, or any combination thereof.

Another apparatus for wireless communication at a UE is described. The apparatus may include means for receiving a message including first transmission configuration indicator state information and second transmission configuration indicator state information different from the first transmission configuration indicator state information, where the first transmission configuration indicator state information is associated with a set of multiple uplink resources and where the second transmission configuration indicator state information is associated with a set of multiple downlink resources, means for identifying two or more channels, or reference signals, or any combination thereof, to which a transmission configuration indicator state is to be applied, the two or more channels including two or more uplink channels indicated within the first transmission configuration indicator state information or two or more downlink channels indicated within the second transmission configuration indicator state information, where the transmission configuration indicator state corresponds to one or more source reference signals associated with QCL assumptions for the two or more channels, or the reference signals, or any combination thereof, and means for determining common beam information for the set of multiple uplink resources or the set of multiple downlink resources based on applying the transmission configuration indicator state to the two or more channels, or the reference signals, or any combination thereof.

A non-transitory computer-readable medium storing code for wireless communication at a UE is described. The code may include instructions executable by a processor to receive a message including first transmission configuration indicator state information and second transmission configuration indicator state information different from the first transmission configuration indicator state information, where the first transmission configuration indicator state information is associated with a set of multiple uplink resources and where the second transmission configuration indicator state information is associated with a set of multiple downlink resources, identify two or more channels, or reference signals, or any combination thereof, to which a transmission configuration indicator state is to be applied, the two or more channels including two or more uplink channels indicated within the first transmission configuration indicator state information or two or more downlink channels indicated within the second transmission configuration indicator state information, where the transmission configuration indicator state corresponds to one or more source reference signals associated with QCL assumptions for the two or more channels, or the reference signals, or any combination thereof, and determine common beam information for the set of multiple uplink resources or the set of multiple downlink resources based on applying the transmission configuration indicator state to the two or more channels, or the reference signals, or any combination thereof.

Some examples of the method, apparatuses, and non-transitory computer-readable medium described herein may further include operations, features, means, or instructions for determining that a same source reference signal may be associated with the QCL assumptions for each of the two or more channels, or the reference signals, or any combination thereof, based on the transmission configuration indicator state, where the common beam information includes a common beam that corresponds to the same source reference signal and communicating with a base station over the two or more channels using the common beam.

Some examples of the method, apparatuses, and non-transitory computer-readable medium described herein may further include operations, features, means, or instructions for determining that different source reference signals may be associated with the QCL assumptions for each of the two or more channels, or the reference signals, or any combination thereof, based on the transmission configuration indicator state, where the common beam information includes a first beam and a second beam, the first beam corresponding to a first source reference signal and a first channel of the two or more channels or a first reference signal of the reference signals, and where the second beam corresponds to a second source reference signal and a second channel of the two or more channels or a second reference signal of the reference signals and communicating with a base station over the first channel using the first beam and over the second channel using the second beam, where the first beam and the second beam include different beams oriented in a substantially same direction.

Some examples of the method, apparatuses, and non-transitory computer-readable medium described herein may further include operations, features, means, or instructions for identifying the transmission configuration indicator state based on an information field including a transmission configuration indicator state identity corresponding to the transmission configuration indicator state, where the information field may be within the first transmission configuration indicator state information or within the second transmission configuration indicator state information.

In some examples of the method, apparatuses, and non-transitory computer-readable medium described herein, the information field includes a dedicated field for indicating one or more common beams, a common field for indicating common uplink and downlink beam information, a field for indicating downlink beam information, a field for indicating uplink beam information, or any combination thereof.

Some examples of the method, apparatuses, and non-transitory computer-readable medium described herein may further include operations, features, means, or instructions for identifying the one or more source reference signals based on one or more QCL information fields, where the one or more QCL information fields may be indicated within the first transmission configuration indicator state information or the second transmission configuration indicator state information.

In some examples of the method, apparatuses, and non-transitory computer-readable medium described herein, each source reference signal of the one or more source reference signals indicates one or more QCL types, and the one or more QCL types may be associated with a set of parameters including a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

Some examples of the method, apparatuses, and non-transitory computer-readable medium described herein may further include operations, features, means, or instructions for determining that the one or more source reference signals indicate combinations of the one or more QCL types, or the set of parameters, or both, where the QCL assumptions for the two or more channels, or the reference signals, or any combination thereof, may be based on the determination.

Some examples of the method, apparatuses, and non-transitory computer-readable medium described herein may further include operations, features, means, or instructions for determining that a source reference signal of the one or more source reference signals corresponds to a set of multiple QCL assumptions for the two or more channels, or the reference signals, or any combination thereof, where the QCL assumptions for the two or more channels, or the reference signals, or any combination thereof, may be based on the determination.

Some examples of the method, apparatuses, and non-transitory computer-readable medium described herein may further include operations, features, means, or instructions for identifying a location of each source reference signal of the one or more source reference signals, the location being indicated within the first transmission configuration indicator state information or the second transmission configuration indicator state information, where the location may be based on an indication of a serving cell identity, or a bandwidth part identity, or both.

Some examples of the method, apparatuses, and non-transitory computer-readable medium described herein may further include operations, features, means, or instructions for determining that the transmission configuration indicator state for the two or more channels, or the reference signals, or any combination thereof, indicates a set of multiple beams, where a first set of source reference signals from the one or more source reference signals indicates a first beam of the set of multiple beams, a first channel of the two or more channels, a first reference signal of the reference signals, or any combination thereof, and where a second set of source reference signals from the one or more source reference signals indicates a second beam of the set of multiple beams, a second channel of the two or more channels, a second reference signal of the reference signals, or any combination thereof, the second set of source reference signals being different from the first set of source reference signals.

Some examples of the method, apparatuses, and non-transitory computer-readable medium described herein may further include operations, features, means, or instructions for identifying a set of power control parameters associated with the set of multiple uplink resources, the set of power control parameters being identified within the first transmission configuration indicator state information, where the set of power control parameters includes a pathloss reference signal, a target receive power parameter, a path-loss compensation factor, a closed loop index, a power control group identity, or any combination thereof and applying the set of power control parameters to an uplink transmission based on the transmission configuration indicator state.

Some examples of the method, apparatuses, and non-transitory computer-readable medium described herein may further include operations, features, means, or instructions for determining that the transmission configuration indicator state indicates two or more beams for the uplink transmission, where a first subset of the set of power control parameters may be applied to a first beam of the two or more beams and a second subset of the set of power control parameters may be applied to a second beam of the two or more beams.

Some examples of the method, apparatuses, and non-transitory computer-readable medium described herein may further include operations, features, means, or instructions for identifying a set of timing advance parameters associated with the set of multiple uplink resources, the set of timing advance parameters being identified within the first transmission configuration indicator state information, where the set of timing advance parameters includes a timing advance group identity, a timing advance value, or both and applying the set of timing advance parameters to an uplink transmission based on the transmission configuration indicator state.

Some examples of the method, apparatuses, and non-transitory computer-readable medium described herein may further include operations, features, means, or instructions for determining that the transmission configuration indicator state indicates two or more beams for the uplink transmission, where a first subset of the set of timing advance parameters may be applied to a first beam of the two or more beams and a second subset of the set of timing advance parameters may be applied to a second beam of the two or more beams.

Some examples of the method, apparatuses, and non-transitory computer-readable medium described herein may further include operations, features, means, or instructions for identifying a set of parameters associated with codebook-based transmissions on the set of multiple uplink resources, or non-codebook-based transmissions on the set of multiple uplink resources, or both, the set of parameters being identified within the first transmission configuration indicator state information, where the set of parameters includes a sounding reference signal resource indicator, a transmission precoding matrix indicator, a transmission rank indicator, or any combination thereof and applying the set of parameters to an uplink transmission based on the transmission configuration indicator state.

Some examples of the method, apparatuses, and non-transitory computer-readable medium described herein may further include operations, features, means, or instructions for determining that the transmission configuration indicator state indicates two or more beams, the two or more channels, or the reference signals, or any combination thereof, for the uplink transmission, where a first subset of the set of parameters may be applied to a first beam of the two or more beams and a second subset of the set of parameters may be applied to a second beam of the two or more beams.

Some examples of the method, apparatuses, and non-transitory computer-readable medium described herein may further include operations, features, means, or instructions for identifying one or more antenna panel identifiers associated with respective antenna panels of the UE, the one or more antenna panel identifiers being identified within the first transmission configuration indicator state information, where the respective antenna panels of the UE may be associated with transmitting over a same or different channel of the two or more uplink channels based on the transmission configuration indicator state.

In some examples of the method, apparatuses, and non-transitory computer-readable medium described herein, each of the two or more channels may be associated with a respective demodulation reference signal indicated within the first transmission configuration indicator state information being or the second transmission configuration indicator state information and the one or more source reference signals include a synchronization signal block, a channel state information reference signal, a sounding reference signal, a positioning reference signal, a reference signal associated with a physical random access channel, a demodulation reference signal associated with a physical downlink control channel, a demodulation reference signal associated with a physical downlink shared channel, a demodulation reference signal associated with a physical uplink shared channel, a demodulation reference signal associated with a physical uplink control channel, or any combination thereof.

A method for wireless communication at a base station is described. The method may include determining common beam information for a set of multiple uplink resources and a set of multiple downlink resources, configuring two or more channels, or reference signals, or any combination thereof, to which a transmission configuration indicator state is to be applied based on the common beam information, the two or more channels including two or more uplink channels indicated within first transmission configuration indicator state information or two or more downlink channels indicated within second transmission configuration indicator state information, where the transmission configuration indicator state corresponds to one or more source reference signals associated with QCL assumptions for the two or more channels, or the reference signals, or any combination thereof, and transmitting, to a UE, a message including the first transmission configuration indicator state information and the second transmission configuration indicator state information different from the first transmission configuration indicator state information, where the first transmission configuration indicator state information is associated with the set of multiple uplink resources and where the second transmission configuration indicator state information is associated with the set of multiple downlink resources.

An apparatus for wireless communication at a base station is described. The apparatus may include a processor, memory in electronic communication with the processor, and instructions stored in the memory. The instructions may be executable by the processor to cause the apparatus to determine common beam information for a set of multiple uplink resources and a set of multiple downlink resources, configure two or more channels, or reference signals, or any combination thereof, to which a transmission configuration indicator state is to be applied based on the common beam information, the two or more channels including two or more uplink channels indicated within first transmission configuration indicator state information or two or more downlink channels indicated within second transmission configuration indicator state information, where the transmission configuration indicator state corresponds to one or more source reference signals associated with QCL assumptions for the two or more channels, or the reference signals, or any combination thereof, and transmit, to a UE, a message including the first transmission configuration indicator state information and the second transmission configuration indicator state information different from the first transmission configuration indicator state information, where the first transmission configuration indicator state information is associated with the set of multiple uplink resources and where the second transmission configuration indicator state information is associated with the set of multiple downlink resources.

Another apparatus for wireless communication at a base station is described. The apparatus may include means for determining common beam information for a set of multiple uplink resources and a set of multiple downlink resources, means for configuring two or more channels, or reference signals, or any combination thereof, to which a transmission configuration indicator state is to be applied based on the common beam information, the two or more channels including two or more uplink channels indicated within first transmission configuration indicator state information or two or more downlink channels indicated within second transmission configuration indicator state information, where the transmission configuration indicator state corresponds to one or more source reference signals associated with QCL assumptions for the two or more channels, or the reference signals, or any combination thereof, and means for transmitting, to a UE, a message including the first transmission configuration indicator state information and the second transmission configuration indicator state information different from the first transmission configuration indicator state information, where the first transmission configuration indicator state information is associated with the set of multiple uplink resources and where the second transmission configuration indicator state information is associated with the set of multiple downlink resources.

A non-transitory computer-readable medium storing code for wireless communication at a base station is described. The code may include instructions executable by a processor to determine common beam information for a set of multiple uplink resources and a set of multiple downlink resources, configure two or more channels, or reference signals, or any combination thereof, to which a transmission configuration indicator state is to be applied based on the common beam information, the two or more channels including two or more uplink channels indicated within first transmission configuration indicator state information or two or more downlink channels indicated within second transmission configuration indicator state information, where the transmission configuration indicator state corresponds to one or more source reference signals associated with QCL assumptions for the two or more channels, or the reference signals, or any combination thereof, and transmit, to a UE, a message including the first transmission configuration indicator state information and the second transmission configuration indicator state information different from the first transmission configuration indicator state information, where the first transmission configuration indicator state information is associated with the set of multiple uplink resources and where the second transmission configuration indicator state information is associated with the set of multiple downlink resources.

Some examples of the method, apparatuses, and non-transitory computer-readable medium described herein may further include operations, features, means, or instructions for configuring a same source reference signal for the QCL assumptions for each of the two or more channels, or the reference signals, or any combination thereof, based on the transmission configuration indicator state, where the common beam information includes a common beam that corresponds to the same source reference signal and communicating with the UE over the two or more channels using the common beam.

Some examples of the method, apparatuses, and non-transitory computer-readable medium described herein may further include operations, features, means, or instructions for configuring different source reference signals for the QCL assumptions for each of the two or more channels, or the reference signals, or any combination thereof, based on the transmission configuration indicator state, where the common beam information includes a first beam and a second beam, the first beam corresponding to a first source reference signal and a first channel of the two or more channels or a first reference signal of the reference signals, and where the second beam corresponds to a second source reference signal and a second channel of the two or more channels or a second reference signal of the reference signals and communicating with the UE over the first channel using the first beam and over the second channel using the second beam, where the first beam and the second beam include different beams oriented in a substantially same direction.

Some examples of the method, apparatuses, and non-transitory computer-readable medium described herein may further include operations, features, means, or instructions for transmitting, within the first transmission configuration indicator state information or within the second transmission configuration indicator state information, an information field including a transmission configuration indicator state identity corresponding to the transmission configuration indicator state, where the information field includes a dedicated field for indicating one or more common beams, a common field for indicating common uplink and downlink beam information, a field for indicating downlink beam information, a field for indicating uplink beam information, or any combination thereof.

Some examples of the method, apparatuses, and non-transitory computer-readable medium described herein may further include operations, features, means, or instructions for transmitting, within the first transmission configuration indicator state information or within the second transmission configuration indicator state information, one or more QCL information fields that indicate the one or more source reference signals for the QCL assumptions for the two or more channels, or the reference signals, or any combination thereof.

In some examples of the method, apparatuses, and non-transitory computer-readable medium described herein, each source reference signal of the one or more source reference signals indicates one or more QCL types, and the one or more QCL types may be associated with a set of parameters including a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

Some examples of the method, apparatuses, and non-transitory computer-readable medium described herein may further include operations, features, means, or instructions for transmitting, within the first transmission configuration indicator state information, a set of uplink power control parameters associated with the set of multiple uplink resources, where the set of uplink power control parameters includes a pathloss reference signal, a target receive power parameter, a path-loss compensation factor, a closed loop index, a power control group identity, or any combination thereof.

Some examples of the method, apparatuses, and non-transitory computer-readable medium described herein may further include operations, features, means, or instructions for transmitting, within the first transmission configuration indicator state information, a set of timing advance parameters associated with the set of multiple uplink resources, where the set of timing advance parameters includes a timing advance group identity, a timing advance value, or both.

Some examples of the method, apparatuses, and non-transitory computer-readable medium described herein may further include operations, features, means, or instructions for transmitting, within the first transmission configuration indicator state information, a set of parameters associated with codebook-based transmissions on the set of multiple uplink resources, or non-codebook-based transmissions on the set of multiple uplink resources, or both, where the set of parameters includes a sounding reference signal resource indicator, a transmission precoding matrix indicator, a transmission rank indicator, or any combination thereof.

DETAILED DESCRIPTION

Figure 1:
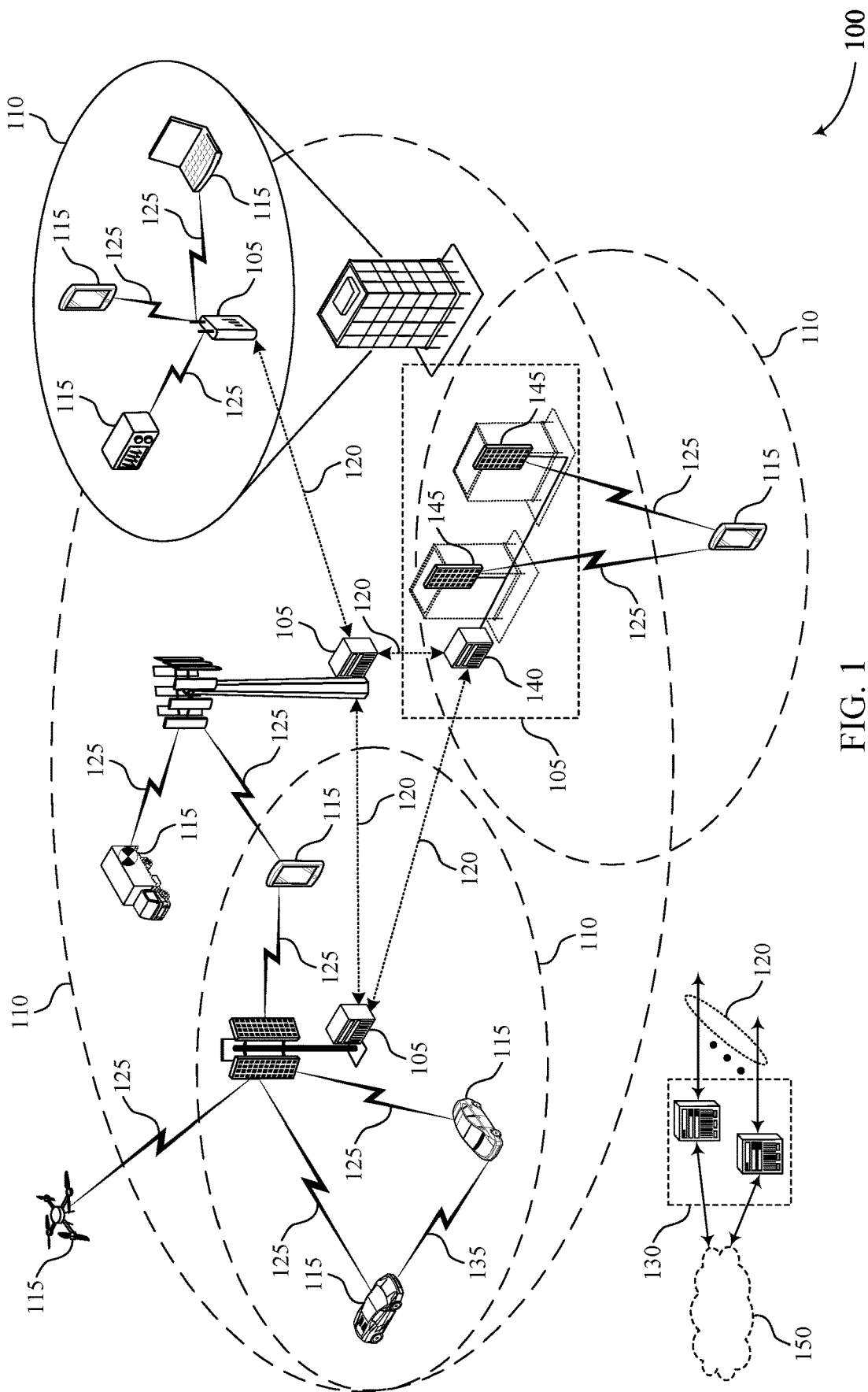
FIG. 1 illustrates an example of a wireless communications system that supports beam indications for multiple uplink or downlink channels and reference signals in accordance with aspects of the present disclosure.

Some wireless communications systems, such as fifth generation (5G) New Radio (NR) systems, may use beamforming techniques to share data between devices (e.g., user equipment (UEs), base stations, or other devices). In such systems, UEs may be configured with beam information (e.g., transmission configuration indicator (TCI) states) that indicates resources for uplink or downlink operation on a set of beams and may further convey information used for identifying various properties that indicate which beams may be used for communications. For example, signals transmitted using different beams may be related to one another, and a quasi co-location (QCL) relationship between one or more transmissions or signals may refer to a relationship between the antenna ports (and the corresponding signaling beams) of the respective transmissions. If two signals are quasi co-located, a receiving device (e.g., a UE) may assume that measured channel properties or other aspects associated with one signal (and its corresponding beam) may also be applied when receiving another, different signal. In some examples, a set of TCI states may be indicated to a UE, where one TCI state may indicate a QCL relationship between a single channel (e.g., a physical downlink control channel (PDCCH) or physical downlink shared channel (PDSCH)) and a corresponding reference signal (or, more specifically, between a demodulation reference signal (DMRS) of the PDSCH or PDCCH and another reference signal (e.g., a source reference signal), such as a channel state information reference signal (CSI-RS) or synchronization signal block (SSB)).

A UE may receive signaling (e.g., radio resource control (RRC) signaling) configuring the UE to operate according to a TCI state, and the UE may communicate with a base station using beams based on the configured TCI state. For example, different channels or reference signals may be configured with different pools of applicable TCI states (e.g., PDSCH may have a TCI state list which may include 8 out of 64 possible TCI states and a different channel may utilize a different pool of TCI states). However, respective beam indications for each different channel using different TCI states may result in additional processing time as well as signaling and network overhead. Therefore, a method for common beam indication for multiple uplink or downlink channels or associated reference signals using TCI states may be desired.

As described herein, a UE may be configured with separate beam indications for uplink and downlink beams, for example, using contents of RRC signaling providing the TCI states for both uplink and downlink resources. In such cases, a common TCI state for multiple different channels and reference signals (e.g., either uplink or downlink) may be used. For example, a UE may receive a message that indicates some TCI state information that may be applied to multiple channels and/or reference signals, and a same TCI state configured for a UE may be applied to multiple different channels/reference signals. In some aspects, a base station may transmit signaling (e.g., RRC signaling) to a UE indicating one or more TCI states, where the TCI states may include common beam indications for multiple uplink or downlink channels (e.g., multiple channels may share a same RRC-configured TCI state pool). The UE may accordingly receive separate TCI states to be applied to multiple uplink channels or reference signals and multiple downlink channels or reference signals. As an example, a UE may receive a TCI state indicating applicability to both a physical uplink control channel (PUCCH) and a physical uplink shared channel (PUSCH) and another TCI state separately indicating applicability to both a PDCCH and a PDSCH. Further, each TCI state that is applicable to multiple channels, or multiple reference signals, or any combination thereof, may also include information indicating one or more source reference signals for QCL assumptions by the UE. That is, the TCI state may indicate which source reference signal(s) may be used to derive QCL assumptions associated with the multiple channels or reference signals (e.g., QCL assumptions based on Doppler shift, Doppler spread, average delay, delay spread, spatial parameters, or any combination thereof). In some examples, the TCI state information signaled to the UE may include an indication of other parameters (e.g., TCI state identifiers (IDs), power control parameters, timing advance parameters, parameters for codebook and/or non-codebook-based transmissions, antenna panel information, or the like). Based on the TCI states, the UE may determine some common beam information and may receive or transmit data via the indicated channels using the determined beam information. Indicating multiple uplink or downlink channels using a TCI state may result in more efficient signaling of beam indications, likewise reducing network and signaling overhead or reduced latency, among other benefits.

Aspects of the disclosure are initially described in the context of wireless communications systems. Aspects of the disclosure are further described with reference to a process flow. Aspects of the disclosure are further illustrated by and described with reference to apparatus diagrams, system diagrams, and flowcharts that relate to beam indications for multiple uplink or downlink channels and reference signals.

FIG. 1 illustrates an example of a wireless communications system 100 that supports beam indications for multiple uplink or downlink channels and reference signals in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may transmit one or more synchronization signal blocks (SSBs) to a UE 115, and the UE 115 may process (e.g., decode) the SSBs in order to obtain system information and begin communications with the base station. A SSB (e.g., a synchronization block) may include synchronization signals such as a primary synchronization signal (PSS), a physical broadcast channel (PBCH), and a secondary synchronization signal (SSS), which may be referred to as acquisition signals and may be transmitted from the base station 105 to the UE 115. The PSS, PBCH, and SSS may each occupy different sets of symbols (e.g., OFDM symbols) and subcarriers of the SSB. A UE 115 may utilize SSBs to acquire downlink synchronization information and system information (e.g., to establish a communication channel with the base station 105). In some cases, some wireless communications system 100 may further utilize SSBs with beam sweeping for beam management purposes. In some cases, one or more SSBs may be included within a synchronization signal burst set, which may include a periodic series or set of SSBs.

In some examples, there may be a QCL relationship between one or more transmissions or signals. A QCL relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, a SSB, or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power) transmitted on a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a TCI state configuration may include one or more parameters associated with a QCL relationship between transmitted signals. For example, a base station 105 may configure a QCL relationship that provides a mapping between a reference signal and antenna ports of another signal (e.g., a DMRS antenna port for PDCCH, a DMRS antenna port for PDSCH, a CSI-RS antenna port for CSI-RS, or the like), and the TCI state may be indicated to the UE 115 by the base station 105. In some cases, a set of TCI states may be indicated to a UE 115 via RRC signaling, where some number of TCI states (e.g., a pool of 8 TCI states from of a total of 64 TCI states may be configured via RRC) and a particular TCI state may be indicated via downlink control information (DCI) (e.g., within a CORESET). The QCL relationship associated with the TCI state (and further established through higher-layer parameters) may provide the UE 115 with the QCL relationship for respective antenna ports and reference signals transmitted by the base station 105.

Some systems may utilize joint beam indications (e.g., TCI states indicating certain QCL information), where a common indication may be applicable to both uplink and downlink beams. In other cases, a separate beam indication may be used, where a first beam indication may be used for multiple uplink beams and a second, different beam indication may be used for multiple downlink beams. However, for such separate beam indications, the contents of the separate indications may not be defined.

In some implementations of the wireless communications system 100, UEs 115 may be configured with beam information (e.g., using TCI states) which indicate resources for uplink or downlink operation on a set of beams. For example, the described techniques may provide for contents of separate beam indications for uplink and downlink beams (e.g., the contents of the RRC signaling that provides the TCI states for both uplink and downlink resources), where a common TCI state for multiple different channels and reference signals (e.g., either uplink or downlink, based on the beam indication) may be used. A UE may receive a message that indicates some TCI state information that may be applied to multiple channels and/or reference signals. That is, a same TCI state indicated to a UE may be applied to multiple different channels/reference signals. An uplink beam indication may include TCI state information that may be applicable to multiple uplink channels (e.g., PUCCH and PUSCH) and/or reference signals (e.g., sounding reference signal (SRS), DMRS of PUCCH, DMRS of PUCCH), whereas a downlink beam indication may include TCI state information that is application to multiple downlink channels (e.g., PDCCH and PDSCH) and/or reference signals (e.g., SSB, CSI-RS, DMRS of PDSCH, DMRS of PDCCH). In either case, the message may indicate which channels and/or reference signals to which a TCI state may be applied. In addition, the TCI state information may include QCL information that indicates various source reference signals used for QCL assumptions.

In some aspects, a TCI state may be applied to the multiple channels and/or reference signals, where a same spatial filter (e.g., a same beam) may be applied to each channel and/or reference signal (e.g., a same beam may be used for all applicable reference signals, and the TCI state may indicate a same source reference signal for a QCL assumption across the multiple reference signals). In other aspects, within a same TCI state, different source reference signals for QCL assumptions may be used for the multiple channels and/or reference signals to which the TCI state is applied. Here, a downlink TCI state may be applicable to both PDSCH and PDCCH, and a source reference signals (e.g., for a QCL assumption) for the PDCCH may be an SSB, whereas a source reference signals for the PDSCH may be a CSI-RS. In some examples, different channels may have TCI states that are selected from the same TCI state pools (e.g., the one or more TCI states configured for PDSCH and PDCCH may be selected from the same set of available TCI states).

The contents of the separate beam indications (e.g., the TCI state information) may further include an indication of TCI state IDs, which may be indicated using one or more information fields for indicating common beam(s), a common (e.g., shared) field for both uplink and downlink beam indications, a separate downlink beam indication, a separate uplink beam indication, or any combination thereof. Additionally, the TCI state information may further indicate details regarding the source reference signals used for QCL assumption, uplink power control information, uplink timing advance parameters, parameters for codebook-based transmissions, parameters for non-codebook based transmissions, antenna panel ID information, or any combination thereof. In some cases, the techniques supported by the wireless communications system 100 may be used in various communications schemes or deployments, such as carrier aggregation (e.g., intra-band carrier aggregation), and may provide for common beam information for data and control transmission and reception between devices.

Figure 2:
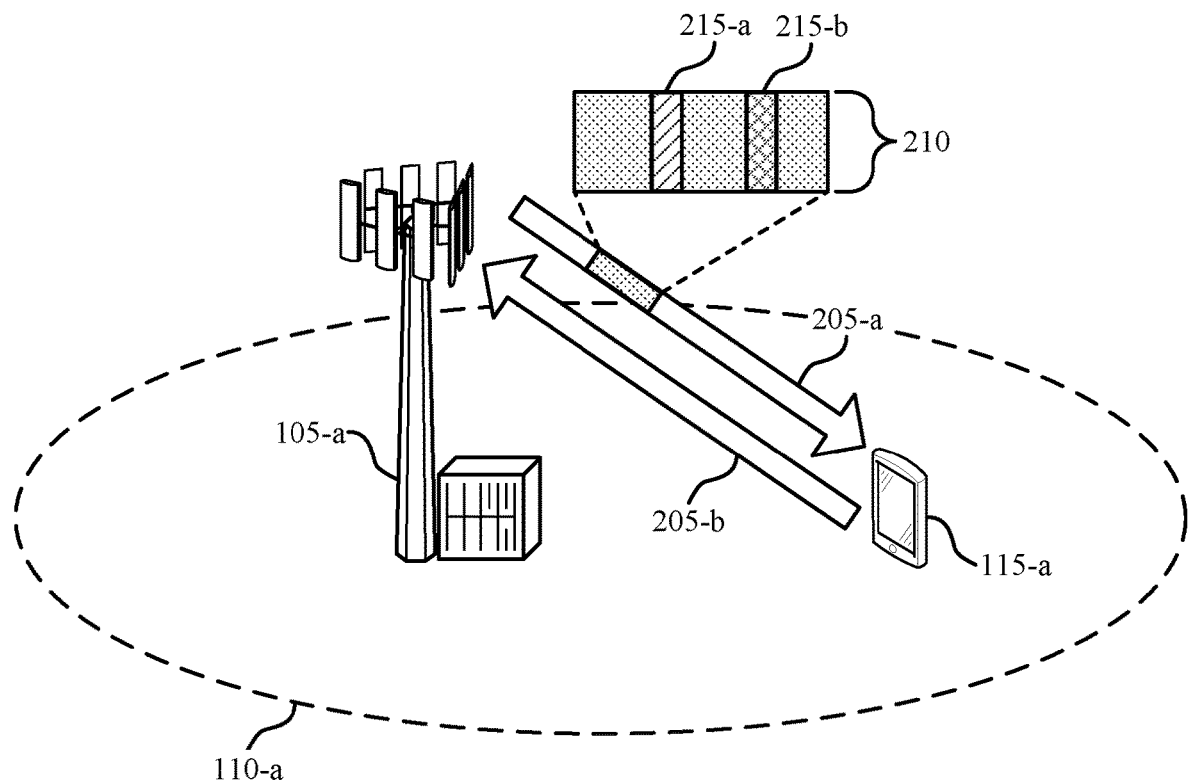
FIG. 2 illustrates an example of a wireless communications system that supports beam indications for multiple uplink or downlink channels and reference signals in accordance with aspects of the present disclosure.

FIG. 2 illustrates an example of a wireless communications system 200 that supports beam indication for multiple uplink or downlink channels and reference signals in accordance with one or more aspects of the present disclosure. In some examples, the wireless communications system 200 may implement aspects of the wireless communications system 100 as described with reference to FIG. 1. The wireless communication system 200 may include a UE 115-a which may be an example of a UE 115 as described with reference to FIG. 1. The wireless communications system 200 may also include a base station 105-a which may be an example of a base station 105 as described with reference to FIG. 1. The base station 105-a may be associated with a cell which provides wireless communications service within a respective coverage area 110-a. Accordingly, the UE 115-a and the base station 105-a may share information via a communication link 205-a and a communication link 205-b. In some examples, the wireless communication system 200 may use beamforming techniques such that the communication links 205-a and 205-b may include one or more beams.

The base station 105-a may determine common beam information for uplink resources and for downlink resources and may transmit a message 210 (e.g., RRC signaling) to the UE 115-a, which includes first TCI state information 215-a and second TCI state information 215-b indicating resources for one or more beams. For example, the first TCI state information 215-a may be associated with uplink resources and the second TCI state information 215-b may be associated with downlink resources. The first TCI state information 215-a and second TCI state information 215-b may be examples of TCI state information elements, and may include indications of one or more TCI states and indications of channels or reference signals to which respective TCI states may be applied. For example, the first TCI state information 215-a may include an indication that a TCI state is to be applied to multiple uplink channels (e.g., applied to PUCCH and to PUSCH) or reference signals, or both. Similarly, the second TCI state information 215-b may include an indication that a TCI state is to be applied to multiple downlink channels (e.g., applied to PDCCH and to PDSCH) or reference signals. It is noted that the TCI states indicated by the first TCI state information 215-a and the second TCI state information 215-b may also be applicable to other channels, and the examples described herein should not be considered limiting. Based on the received message 210, the UE 115-a may identify two or more channels or reference signals to which the TCI states may apply.

To configure the TCI states for the multiple channels and/or reference signals, the TCI state information within the message 210 (e.g., RRC signaling) may include some indication (e.g., explicit indication) of the channels or reference signals to which a TCI state applies. In one example, an RRC field may have a bitmap or index, where the index values may provide different indications of multiple channels or reference signals associated with the TCI state. For instance, each index value may indicate beam information (e.g., a TCI state) that may be applied to one or more channels, where a bit value of 0 (e.g., a 3-bit binary number 000) may indicate beam information applicable to PDSCH, a bit value of 1 (e.g., 001) may indicate beam information applicable to both PDSCH and PDCCH, a bit value of 2 (e.g., 010) may indicate beam information applicable to some other combination of channels, reference signals, or both, and so forth. Additionally or alternatively, a bitmap may provide an indication of the channels to which beam information may be applicable, where a first bit in the bitmap may indicate PDSCH, a second bit in the bitmap may indicate PDSCH, and a third bit in the bitmap may indicate SRS. In such cases, values (e.g., 0 or 1) in the bitmap corresponding to each channel or reference signal may indicate whether the beam information may be applied to that channel or reference signal, otherwise, the beam indication may not be applied to the channel or reference signals. Thus, the different values of the bitmap may indicate the combinations of multiple channels and/or reference signals to which the UE 115-a may apply a TCI state.

The TCI state information 215 (e.g., one or both of first TCI state information 215-a or second TCI state information 215-b) may indicate the applicable channels and/or reference signals for a TCI state (e.g., an uplink TCI state or a downlink TCI state), and the TCI state may further indicate beam information or spatial filter information that may be applied to the multiple channels and/or reference signals. In one aspect, a same beam may be used for each channel of the multiple channels, or each reference signal of the multiple reference signals, or any combination thereof, such that the UE 115-*a* may use a same beam configuration or spatial filter for transmitting or receiving on each channel indicated by the TCI state information 215. In such cases, the TCI state may be associated with a same or common source reference signal (e.g., CSI-RS, SSB, or the like) used for QCL assumptions. Put another way, the same source reference signal associated with a TCI state that is shared by multiple channels/reference signals, may indicate a same beam for the multiple channels/reference signals.

Additionally or alternatively, a TCI state may indicate, for example, different beams, spatial filters, or source reference signals for each channel or reference signal to which the TCI state applies. For example, a TCI state indicated by the second TCI state information 215-*b* may be applicable to both PDCCH and PDSCH, but may include indications of different sources reference signals used for QCL assumptions associated with each channel. In such cases, the PDCCH may use an SSB as a source reference signal for QCL assumptions and the PDSCH may use a CSI-RS as a source reference signal for QCL assumptions. The SSB may, in some examples, correspond to a relatively wide beam and the CSI-RS may correspond to a relatively narrower beam (e.g., in comparison to the SSB beam), and the UE 115-*a* may accordingly identify these respective beams as corresponding to the different channels (e.g., based on the TCI state(s) indicated by the TCI state information).

The TCI state information 215 (e.g., one or both of first TCI state information 215-*a* or second TCI state information 215-*b*) may include an indication (e.g., within one or more information fields or information elements) of an identification (ID) associated with configured TCI states. In some implementations, the TCI state ID may be indicated via a dedicated ID space for a common beam indication (or indication of multiple common beams) or in a common ID space shared for common uplink and/or downlink beam indication. In other examples, the TCI state ID may be indicated in a field used for downlink beam indications or a field for uplink beam indications (e.g., where downlink TCI states and uplink TCI states indicating beam information may be in respective information fields). In some cases, the first TCI state information 215-*a* and the second TCI state information 215-*b* of the message (e.g., the RRC signaling) may indicate, for example, which two channels or reference signals a TCI state (identified via the TCI state ID) may be applied to. Then, the base station 105-*a* may transmit DCI to the UE 115-*a*, and the TCI state may be selected via an indication (e.g., within one or more fields) provided by the DCI. Accordingly, the UE 115-*a* may know which channels the TCI state should be applied to (from the RRC signaling). Here, the multiple channels and/or reference signals indicated by the TCI state information may share a same or common pool of TCI states. In one example, both PUSCH and PUSCH may share a same pool of TCI states. In one example, the TCI state IDs corresponding to one or more TCI state pools may be indicated in the configuration provided by the TCI state information 215. There may be some different values used for different TCI states that may be applicable to different beam indication schemes. For instance, for TCI states that may be applicable to only one channel or reference signal (e.g., a set of legacy TCI states), may correspond to a first set of TCI states (e.g., a first set of 64 TCI states, with IDs indexed from 0 to 64), whereas TCI states that may be applicable to multiple channels e reference signals, as described herein, may correspond to a second set of TCI states (e.g., a second set of 64 TCI states, with IDs indexed from 65 to 128).

The first TCI state information 215-*a* and the second TCI state information may include various information related to the source reference signals used for QCL assumptions. As such, the UE 115-*a* may use QCL information provided within the TCI state information to determine the source reference signals that provide various QCL assumptions. As such, the UE 115-*a* may measure the source reference signal (e.g., CSI-RS or SSBs) which may be associated with some TCI state. Then, based on the measurement of the source reference signals and the applicable TCI state, the UE 115-*a* may know how to transmit or receive multiple channels or reference signals associated with the source reference signals. Thus, each TCI state information 215 may have a source reference signal information field that may indicate one or more source reference signals that may be used for QCL assumptions. In particular, for each QCL information (e.g., QCLInfo information element) within the TCI state information 215, one or multiple source reference signals may provide various QCL assumptions, including characteristics for delay parameters, Doppler parameters, spatial receiving parameters, spatial transmitting parameters, or any combination thereof.

Source reference signals providing QCL assumptions may have one of several types (e.g., SSB, CSI-RS, SRS, positioning reference signal (PRS), physical random access channel (PRACH), or a DMRS associated with the PDSCH, DMRS associated with the PDCCH, DMRS associated with the PUCCH, or DMRS associated with the PUSCH, or any combination thereof). In addition, each source reference signal may provide at least one type of QCL assumption. For example, a source reference signal used for downlink reception may have an associated type (e.g., QCL-TypeA, QCL-TypeB, QCL-TypeC, QCL-TypeD) which indicates one or more QCL characteristics. A QCL-TypeA source reference signal may indicate Doppler shift, Doppler spread, average delay, and delay spread parameters. A QCL-TypeB source reference signal indicate Doppler shift and Doppler spread. A QCL-TypeC source reference signal may indicate Doppler shift and average delay. A QCL-TypeD source reference signal may indicate spatial reception parameters. Similarly, uplink source reference signals may provide spatial relation information for spatial transmission parameters as well as the described QCL characteristics associated with uplink QCL-TypeA/B/C (e.g., QCL-TypeA or QCL-TypeB or QCL-TypeC). In some examples, each source reference signal may provide multiple QCL assumptions. For example, an SSB as a source reference signal may provide both QCL-TypeD and uplink spatial relation information for a common beam.

The TCI state information 215 may include location information for the source reference signals. For example, each source reference signal may have or include location information associated with the location of the source reference signal, where the location information may include a serving cell ID, a BWP ID, or both, where the source reference signal is located (e.g., in a frequency domain). In some examples, if a serving cell ID is not included in the location information, the UE 115-*a* may assume the source reference signal applies to a serving cell on which the corresponding TCI state is configured. In some examples, a serving cell associated with a source reference signal may be different than the serving cell on which the TCI state is configured, for example, if the reference signal is configured for some QCL types (e.g., QCL-TypeC or QCL-TypeD). Additionally or alternatively, if a BWP ID is not included in the location information, the UE 115-*a* may assume the reference signal applies to an active BWP (e.g., an active uplink BWP or active downlink BWP).

In some examples, the TCI state information 215 may indicate combinations of source reference signals to indicate an uplink or a downlink beam based on provided QCL and/or spatial assumptions. In one example, a TCI state may indicate one source reference signal for providing QCL-TypeA/B/C assumptions (e.g., QCL-TypeA, QCL-TypeB, or QCL-TypeC). In another example, a TCI state may indicate three source reference signals including one reference for providing QCL-TypeA/B/C assumptions, another source reference signal for providing QCL-TypeD assumptions, and another source reference signal for providing spatial relation information. In some other examples, a TCI state may indicate two source references including one source reference signal for providing QCL-TypeA/B/C assumptions and another source reference signal for providing both QCL-TypeD assumptions and spatial relation information. In another example, a TCI state may indicate three source reference signals including one source reference signal for providing QCL-TypeA/B/C assumptions, another source reference signal for providing both QCL-TypeD assumptions and spatial relation information, and another source reference signal or providing uplink QCL-TypeA/B/C assumptions. In some examples, if a TCI state indicates multiple uplink or downlink beams for multiple channels or reference signals, then each uplink beam or downlink beam channel or reference signal may be indicated by different sets of source reference signals for QCL or spatial assumptions.

In some examples, the TCI state information 215 (e.g., one or both of first TCI state information 215-*a* or second TCI state information 215-*b*) may include (e.g., in one or more information fields or information elements) an indication of uplink power control parameters (e.g., a pathloss reference signal, a target receive power parameter (e.g., P0), a pathloss compensation factor (which may be referred to as an alpha), a closed-loop power control index, a power control group ID, or the like). In some examples, a TCI state may indicate multiple uplink beams or the TCI state may be applied to multiple channels or reference signals, and each uplink beam or reference signal or channel may have an associated set of uplink power control parameters that is different than other common uplink or downlink beams. That is, respective power control parameters may be configured for different beams, channels, reference signals, or any combination thereof, that are associated with a TCI state.

The TCI state information 215 (e.g., one or both of first TCI state information 215-*a* or second TCI state information 215-*b*) may additionally or alternatively include (e.g., in one or more information fields or information elements) an indication of uplink timing advance parameters. For example, the TCI state information may include a timing advance group ID or a timing advance value for uplink transmission of an uplink beam. In some examples, if a TCI state indicates multiple uplink beams or is applicable to multiple reference signals or channels, each beam, channel, or reference signal may have a set of associated uplink timing advance parameters which may be the same as or different from other common uplink or downlink beams.

In some examples, the TCI state information 215 (e.g., one or both of first TCI state information 215-*a* or second TCI state information 215-*b*) may include (e.g., in one or more information fields or information elements) an indication of parameters for codebook-based transmissions (e.g., transmissions on PUSCH) or non-codebook-based transmissions, or both. For example, the TCI state information may include a scheduling request indicator (SRI), a transmitted precoding matrix indicator (TPMI), a transmission request indicator (TRI), or any combination thereof, for PUSCH transmission on an uplink beam. In some examples, if a TCI state indicates multiple uplink beams, each beam may have a set of parameters for codebook- or non-codebook-based PUSCH transmission. In such cases, respective transmission parameters may be associated with different beams, channels, or reference signals.

In some examples, the TCI state information 215 (e.g., one or both of first TCI state information 215-*a* or second TCI state information 215-*b*) may include (e.g., in one or more information fields or information elements) an indication of one or more UE panel IDs or similar IDs. For example, the UE 115 may have an antenna panel defined to have, for example, an independent analog beam, uplink power control, uplink timing advance, or the like. Accordingly, the TCI state information may include UE panel IDs (also referred to as, for example, antenna port group ID, beam group ID, or the like) to which a configured TCI state applies. In some examples, the TCI state information may include different UE panel IDs for each uplink channel to which the TCI state applies. In other examples, the TCI state information may include one UE panel ID applicable to all uplink channels to which the TCI state applies. In some examples, if TCI state information indicates multiple uplink beams or is applicable to multiple channels or reference signals, each beam, channel, or reference signal may either have different UE panel IDs or may share a same panel ID.

Implementing aspects of the wireless communications system 200 may result in reduced network and signaling overhead. For example, a TCI state ID space may have a reduced size because TCI state information 215 (e.g., indicating one or more TCI states) may be applied to multiple beams, channels, or reference signals. Similarly, a TCI state for multiple channels or reference signals may be established, updated, or applied via fewer control signal transmissions (e.g., one for all channels or reference signals instead of one for each channel or reference signal). For example, if a TCI state is applicable to a PDSCH and a PDCCH, then if the TCI state is selected for the PDSCH then it may also be selected for a PDCCH CORESET (e.g., automatically or implicitly). It is noted that the same may apply to a TCI state applicable to a PUCCH, an SRS, a PUSCH, or any combination thereof.

Figure 3:
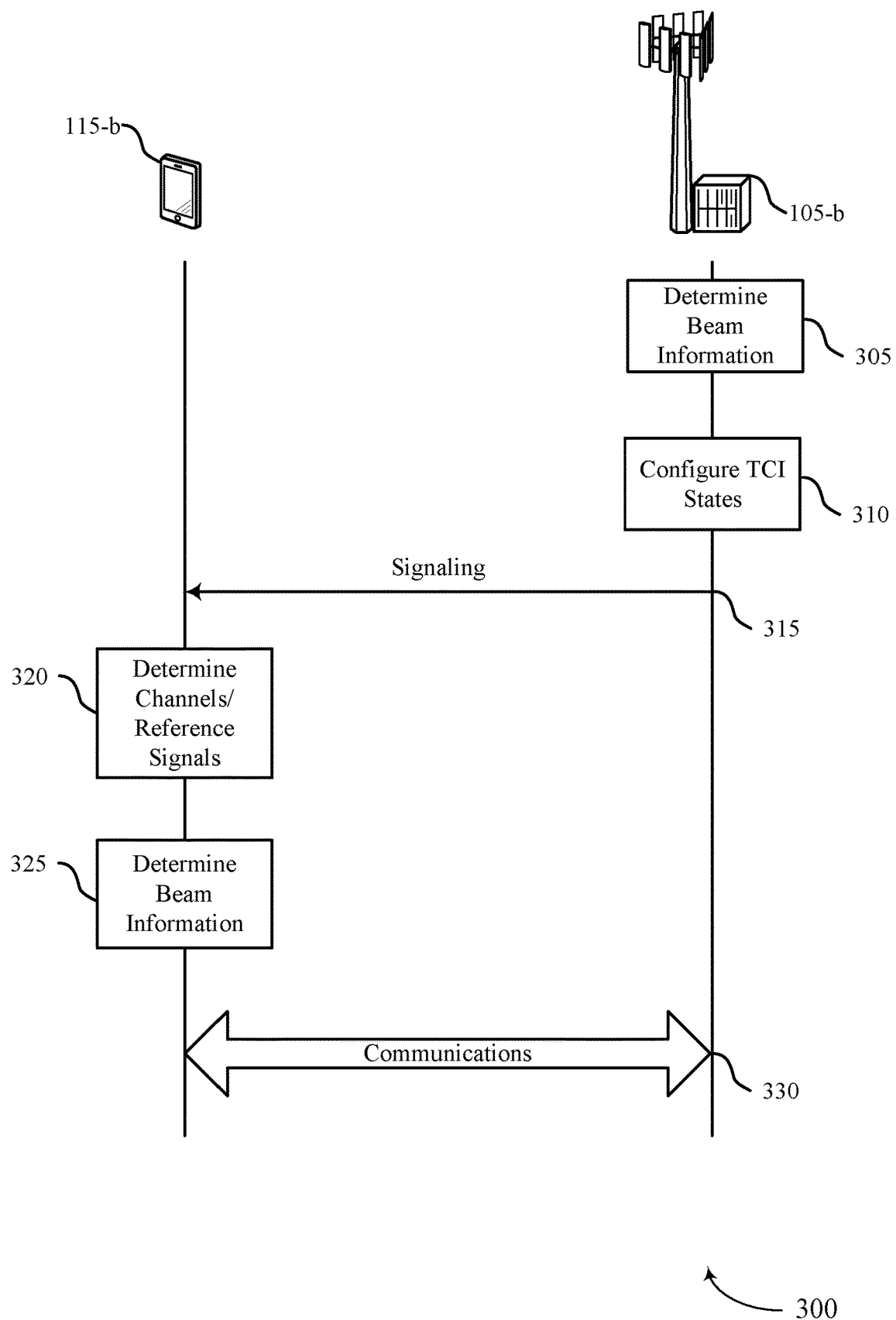
FIG. 3 illustrates an example of a process flow in a system that supports beam indications for multiple uplink or downlink channels and reference signals in accordance with aspects of the present disclosure.

FIG. 3 illustrates an example of a process flow 300 in a system that supports beam indications for multiple uplink or downlink channels and reference signals in accordance with one or more aspects of the present disclosure. In some examples, the process flow 300 may implement aspects of the wireless communications systems 100 or 200 as described with reference to FIGS. 1 and 2. The process flow 300 may include a UE 115-*b* and a base station 105-*b* which may be examples of the corresponding devices described herein. Alternative examples of the following may be implemented, where some processes are performed in a different order than described or are not performed at all. In some examples, processes may include additional features not mentioned below, or further processes may be added.

At 305, the base station 105-*a* may determine common beam information for uplink or downlink resources. For examples, the base station 105-*a* may identify one or more sets of resources associated with beams for uplink or downlink transmission.

At 310, the base station 105-*a* may configure TCI states for channels or reference signals. For example, the base station 105-*a* may configured one TCI state for multiple uplink or downlink channels or reference signals (e.g., PUCCH, PUSCH, PDCCH, PDSCH, SRS, CSI-RS, or the like), such that TCI states for the multiple channels or reference signals may be configured, updated, or applied simultaneously.

At 315, the base station 105-*b* may transmit, and the UE 115-*b* may receive, signaling (e.g., RRC signaling) to the UE 115-*b* indicating the TCI states. In particular, the signaling may include separate beam indications (e.g., TCI state information, which may be an example of an information element or other information field) for uplink and downlink resources. As an example, the base station 105-*b* may transmit a message including first TCI state information and second TCI state information, where the first TCI state information may be different from the second TCI state information. In such cases, the first TCI state information may be associated with multiple uplink resources (e.g., time/frequency resources and/or corresponding directional beams) and the second TCI state information may be associated with multiple downlink resources.

At 320, the UE 115-*b* may determine which channels or reference signals to apply the TCI states to, which may be based on indications included in the TCI state information. For example, the TCI state information may include indications of channels or reference signals to which the TCI state is applicable as well as related information as described herein. In such cases, the UE 115-*b* may identify multiple (e.g., two or more) channels, or reference signals, or any combination thereof, to which a TCI state is to be applied. The multiple channels may include uplink channels indicated within the first TCI state information or downlink channels indicated within the second TCI state information. In addition, the TCI state for application to the multiple channels and/or reference signals may correspond to one or more source reference signals associated with QCL assumptions for the two or more channels, or the reference signals, or any combination thereof. That is, the TCI state information may further indicate which source reference signals (such as one or more SSBs, one or more CSI-RSs, or the like) may be used for QCL assumptions for the multiple channels and/or reference signals.

At 325, the UE 115-*b* may determine common beam information based on the TCI states and the channels or reference signals to which the TCI states are applicable. For example, the UE 115-*b* may determine resources for uplink or downlink beams based on the TCI states. At 330, the UE 115-*b* may communicate with the base station 105-*b* based on the determined resources. For example, the UE 115-*b* may transmit or receive information over the multiple channels and using one or more beams determined based on the TCI states.

Figure 4:
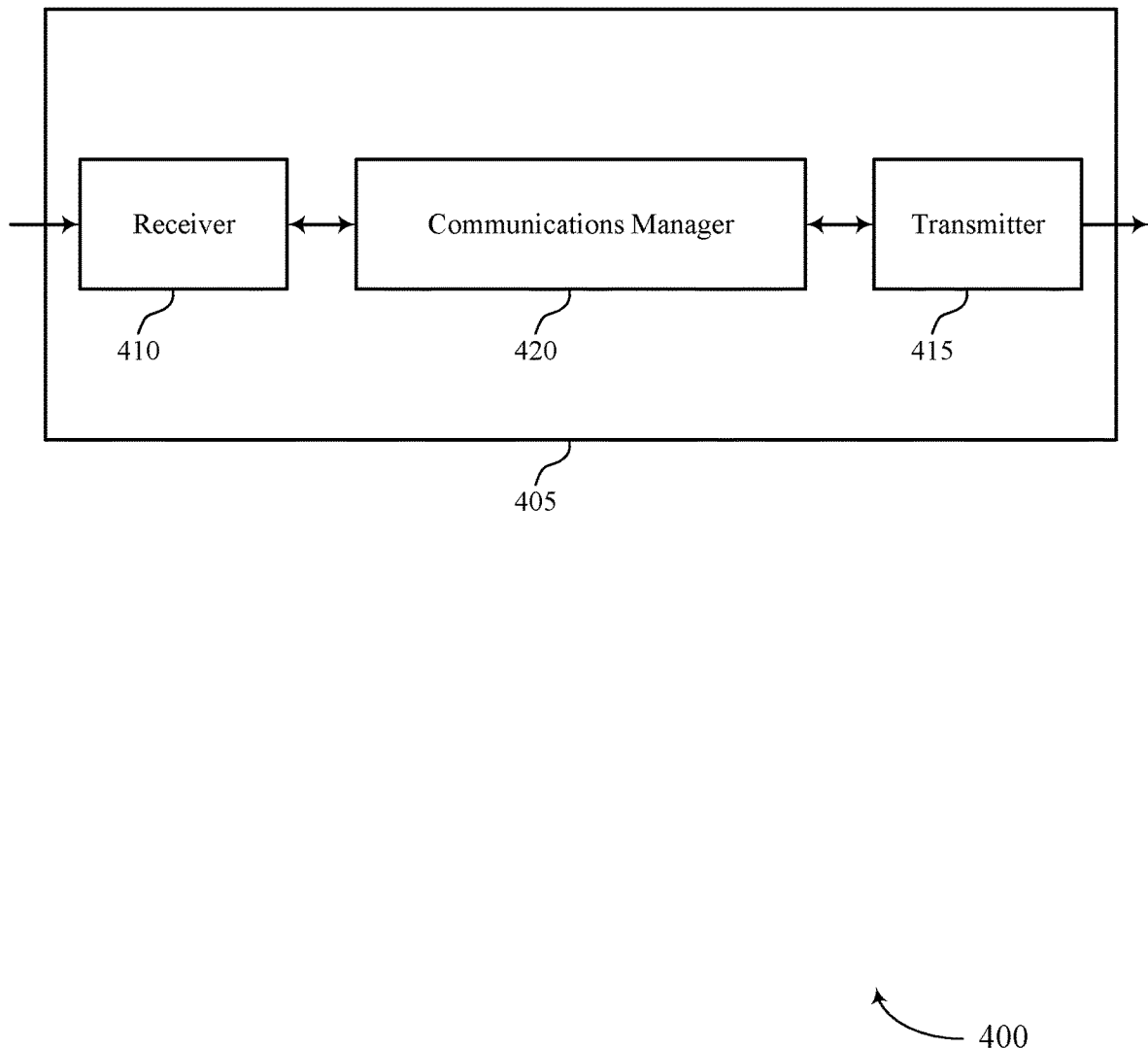
FIGS. 4 and 5 show block diagrams of devices that support beam indications for multiple uplink or downlink channels and reference signals in accordance with aspects of the present disclosure.

FIG. 4 shows a block diagram 400 of a device 405 that supports beam indications for multiple uplink or downlink channels and reference signals in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to beam indications for multiple uplink or downlink channels and reference signals). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to beam indications for multiple uplink or downlink channels and reference signals). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of beam indications for multiple uplink or downlink channels and reference signals as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving a message including first transmission configuration indicator state information and second transmission configuration indicator state information different from the first transmission configuration indicator state information, where the first transmission configuration indicator state information is associated with a set of multiple uplink resources and where the second transmission configuration indicator state information is associated with a set of multiple downlink resources. The communications manager 420 may be configured as or otherwise support a means for identifying two or more channels, or reference signals, or any combination thereof, to which a transmission configuration indicator state is to be applied, the two or more channels including two or more uplink channels indicated within the first transmission configuration indicator state information or two or more downlink channels indicated within the second transmission configuration indicator state information, where the transmission configuration indicator state corresponds to one or more source reference signals associated with QCL assumptions for the two or more channels, or the reference signals, or any combination thereof. The communications manager 420 may be configured as or otherwise support a means for determining common beam information for the set of multiple uplink resources or the set of multiple downlink resources based on applying the transmission configuration indicator state to the two or more channels, or the reference signals, or any combination thereof.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced network or signal overhead, reduced latency, or more efficient communications, among other benefits.

Figure 5:
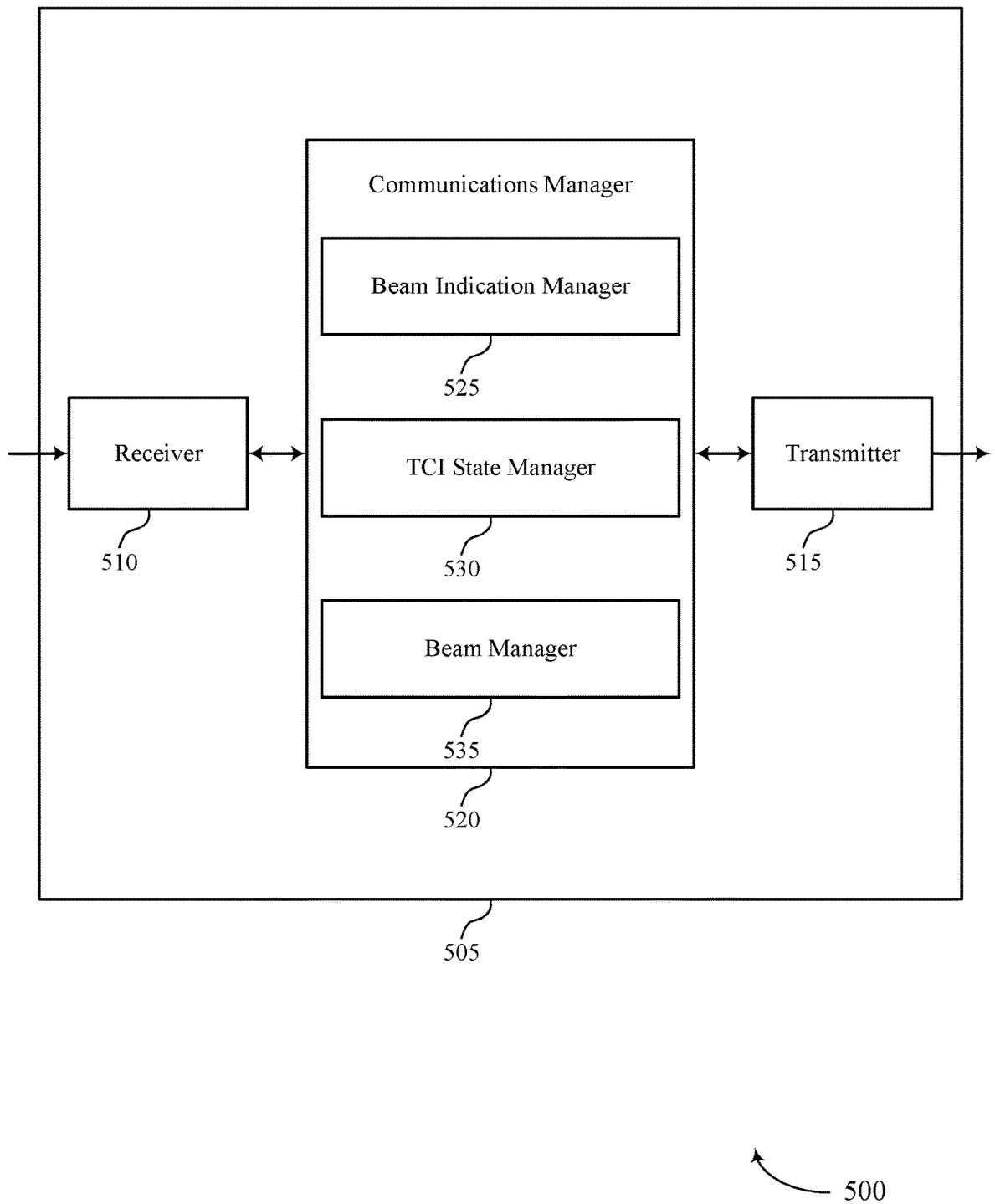

FIG. 5 shows a block diagram 500 of a device 505 that supports beam indications for multiple uplink or downlink channels and reference signals in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam indications for multiple uplink or downlink channels and reference signals). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam indications for multiple uplink or downlink channels and reference signals). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of beam indications for multiple uplink or downlink channels and reference signals as described herein. For example, the communications manager 520 may include a beam indication manager 525, a TCI state manager 530, a beam manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The beam indication manager 525 may be configured as or otherwise support a means for receiving a message including first TCI state information and second TCI state information different from the first TCI state information, where the first TCI state information is associated with a set of multiple uplink resources and where the second TCI state information is associated with a set of multiple downlink resources. The TCI state manager 530 may be configured as or otherwise support a means for identifying two or more channels, or reference signals, or any combination thereof, to which a TCI state is to be applied. In some examples, the two or more channels may include two or more uplink channels indicated within the first TCI state information or two or more downlink channels indicated within the second TCI state information. In some aspects, the TCI state corresponds to one or more source reference signals associated with QCL assumptions for the two or more channels, or the reference signals, or any combination thereof. The beam manager 535 may be configured as or otherwise support a means for determining common beam information for the set of multiple uplink resources or the set of multiple downlink resources based on applying the TCI state to the two or more channels, or the reference signals, or any combination thereof.

Figure 6:
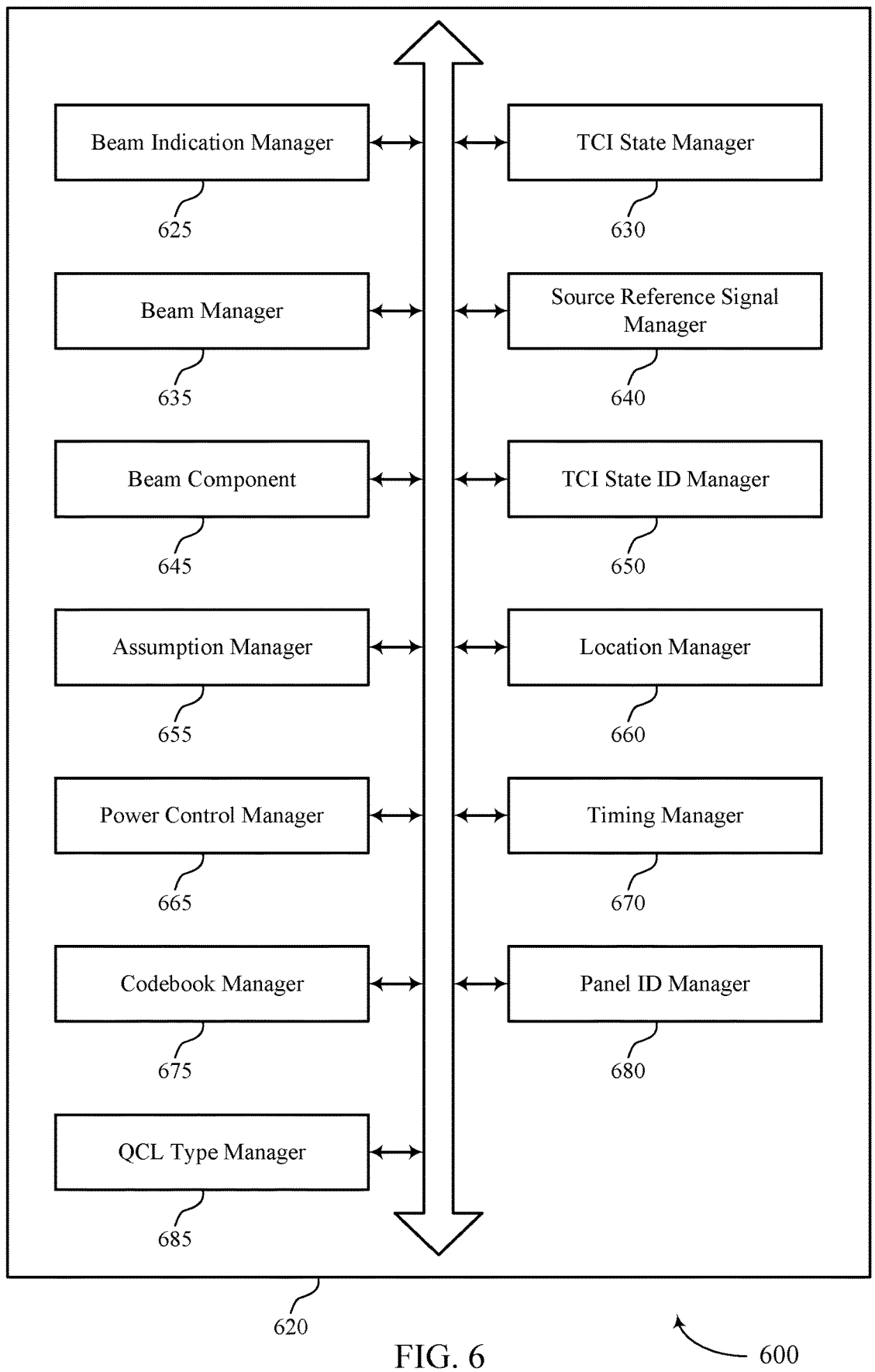
FIG. 6 shows a block diagram of a communications manager that supports beam indications for multiple uplink or downlink channels and reference signals in accordance with aspects of the present disclosure.

FIG. 6 shows a block diagram 600 of a communications manager 620 that supports beam indications for multiple uplink or downlink channels and reference signals in accordance with aspects of the present disclosure. The communications manager 620 may be an example of aspects of a communications manager 420, a communications manager 520, or both, as described herein. The communications manager 620, or various components thereof, may be an example of means for performing various aspects of beam indications for multiple uplink or downlink channels and reference signals as described herein. For example, the communications manager 620 may include a beam indication manager 625, a TCI state manager 630, a beam manager 635, a source reference signal manager 640, a beam component 645, a TCI state ID manager 650, an assumption manager 655, a location manager 660, a power control manager 665, a timing manager 670, a codebook manager 675, a panel ID manager 680, a QCL type manager 685, or any combination thereof. Each of these components may communicate, directly or indirectly, with one another (e.g., via one or more buses).

The communications manager 620 may support wireless communication at a UE in accordance with examples as disclosed herein. The beam indication manager 625 may be configured as or otherwise support a means for receiving a message including first TCI state information and second TCI state information different from the first TCI state information, where the first TCI state information is associated with a set of multiple uplink resources and where the second TCI state information is associated with a set of multiple downlink resources. The TCI state manager 630 may be configured as or otherwise support a means for identifying two or more channels, or reference signals, or any combination thereof, to which a TCI state is to be applied. In some examples, the two or more channels may include two or more uplink channels indicated within the first TCI state information or two or more downlink channels indicated within the second TCI state information, where the TCI state corresponds to one or more source reference signals associated with QCL assumptions for the two or more channels, or the reference signals, or any combination thereof. The beam manager 635 may be configured as or otherwise support a means for determining common beam information for the set of multiple uplink resources or the set of multiple downlink resources based on applying the TCI state to the two or more channels, or the reference signals, or any combination thereof.

In some examples, the source reference signal manager 640 may be configured as or otherwise support a means for determining that a same source reference signal is associated with the QCL assumptions for each of the two or more channels, or the reference signals, or any combination thereof, based on the TCI state, where the common beam information includes a common beam that corresponds to the same source reference signal. In some examples, the beam component 645 may be configured as or otherwise support a means for communicating with a base station over the two or more channels using the common beam.

In some examples, the source reference signal manager 640 may be configured as or otherwise support a means for determining that different source reference signals are associated with the QCL assumptions for each of the two or more channels, or the reference signals, or any combination thereof, based on the TCI state. In some examples, the common beam information may include a first beam and a second beam, where the first beam may correspond to a first source reference signal and a first channel of the two or more channels or a first reference signal of the reference signals, and the second beam may correspond to a second source reference signal and a second channel of the two or more channels or a second reference signal of the reference signals. In some examples, the beam component 645 may be configured as or otherwise support a means for communicating with a base station over the first channel using the first beam and over the second channel using the second beam, where the first beam and the second beam include different beams oriented in a substantially same direction.

In some examples, the TCI state ID manager 650 may be configured as or otherwise support a means for identifying the TCI state based on an information field including a TCI state identity corresponding to the TCI state, where the information field is within the first TCI state information or within the second TCI state information.

In some examples, the information field includes a dedicated field for indicating one or more common beams, a common field for indicating common uplink and downlink beam information, a field for indicating downlink beam information, a field for indicating uplink beam information, or any combination thereof.

In some examples, the source reference signal manager 640 may be configured as or otherwise support a means for identifying the one or more source reference signals based on one or more QCL information fields, where the one or more QCL information fields are indicated within the first TCI state information or the second TCI state information.

In some examples, each source reference signal of the one or more source reference signals indicates one or more QCL types. In some examples, the one or more QCL types are associated with a set of parameters including a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

In some examples, the QCL type manager 685 may be configured as or otherwise support a means for determining that the one or more source reference signals indicate combinations of the one or more QCL types, or the set of parameters, or both, where the QCL assumptions for the two or more channels, or the reference signals, or any combination thereof, are based on the determination.

In some examples, the assumption manager 655 may be configured as or otherwise support a means for determining that a source reference signal of the one or more source reference signals corresponds to a set of multiple QCL assumptions for the two or more channels, or the reference signals, or any combination thereof. In some examples, the QCL assumptions for the two or more channels, or the reference signals, or any combination thereof, may be based on the determination.

In some examples, the location manager 660 may be configured as or otherwise support a means for identifying a location of each source reference signal of the one or more source reference signals, the location being indicated within the first TCI state information or the second TCI state information, where the location is based on an indication of a serving cell identity, or a bandwidth part identity, or both.

In some examples, the TCI state manager 630 may be configured as or otherwise support a means for determining that the TCI state for the two or more channels, or the reference signals, or any combination thereof, indicates a set of multiple beams. In some examples, a first set of source reference signals from the one or more source reference signals may indicate a first beam of the set of multiple beams, a first channel of the two or more channels, a first reference signal of the reference signals, or any combination thereof. Additionally or alternatively, a second set of source reference signals from the one or more source reference signals may indicate a second beam of the set of multiple beams, a second channel of the two or more channels, a second reference signal of the reference signals, or any combination thereof. In some cases, the second set of source reference signals may be different from the first set of source reference signals.

In some examples, the power control manager 665 may be configured as or otherwise support a means for identifying a set of power control parameters associated with the set of multiple uplink resources, the set of power control parameters being identified within the first TCI state information. In some cases, the set of power control parameters may include a pathloss reference signal, a target receive power parameter, a pathloss compensation factor, a closed loop index, a power control group identity, or any combination thereof. In some examples, the power control manager 665 may be configured as or otherwise support a means for applying the set of power control parameters to an uplink transmission based on the TCI state.

In some examples, the power control manager 665 may be configured as or otherwise support a means for determining that the TCI state indicates two or more beams for the uplink transmission, where a first subset of the set of power control parameters is applied to a first beam of the two or more beams and a second subset of the set of power control parameters is applied to a second beam of the two or more beams.

In some examples, the timing manager 670 may be configured as or otherwise support a means for identifying a set of timing advance parameters associated with the set of multiple uplink resources, the set of timing advance parameters being identified within the first TCI state information, where the set of timing advance parameters includes a timing advance group identity, a timing advance value, or both. In some examples, the timing manager 670 may be configured as or otherwise support a means for applying the set of timing advance parameters to an uplink transmission based on the TCI state.

In some examples, the timing manager 670 may be configured as or otherwise support a means for determining that the TCI state indicates two or more beams for the uplink transmission, where a first subset of the set of timing advance parameters is applied to a first beam of the two or more beams and a second subset of the set of timing advance parameters is applied to a second beam of the two or more beams.

In some examples, the codebook manager 675 may be configured as or otherwise support a means for identifying a set of parameters associated with codebook-based transmissions on the set of multiple uplink resources, or non-codebook-based transmissions on the set of multiple uplink resources, or both, the set of parameters being identified within the first TCI state information, where the set of parameters includes a sounding reference signal resource indicator, a transmission precoding matrix indicator, a transmission rank indicator, or any combination thereof. In some examples, the codebook manager 675 may be configured as or otherwise support a means for applying the set of parameters to an uplink transmission based on the TCI state.

In some examples, the codebook manager 675 may be configured as or otherwise support a means for determining that the TCI state indicates two or more beams, the two or more channels, or the reference signals, or any combination thereof, for the uplink transmission, where a first subset of the set of parameters is applied to a first beam of the two or more beams and a second subset of the set of parameters is applied to a second beam of the two or more beams.

In some examples, the panel ID manager 680 may be configured as or otherwise support a means for identifying one or more antenna panel identifiers associated with respective antenna panels of the UE, the one or more antenna panel identifiers being identified within the first TCI state information, where the respective antenna panels of the UE are associated with transmitting over a same or different channel of the two or more uplink channels based on the TCI state.

In some examples, each of the two or more channels are associated with a respective demodulation reference signal indicated within the first TCI state information being or the second TCI state information. In some examples, the one or more source reference signals include a synchronization signal block, a channel state information reference signal, a sounding reference signal, a positioning reference signal, a reference signal associated with a physical random access channel, a demodulation reference signal associated with a physical downlink control channel, a demodulation reference signal associated with a physical downlink shared channel, a demodulation reference signal associated with a physical uplink shared channel, a demodulation reference signal associated with a physical uplink control channel, or any combination thereof.

Figure 7:
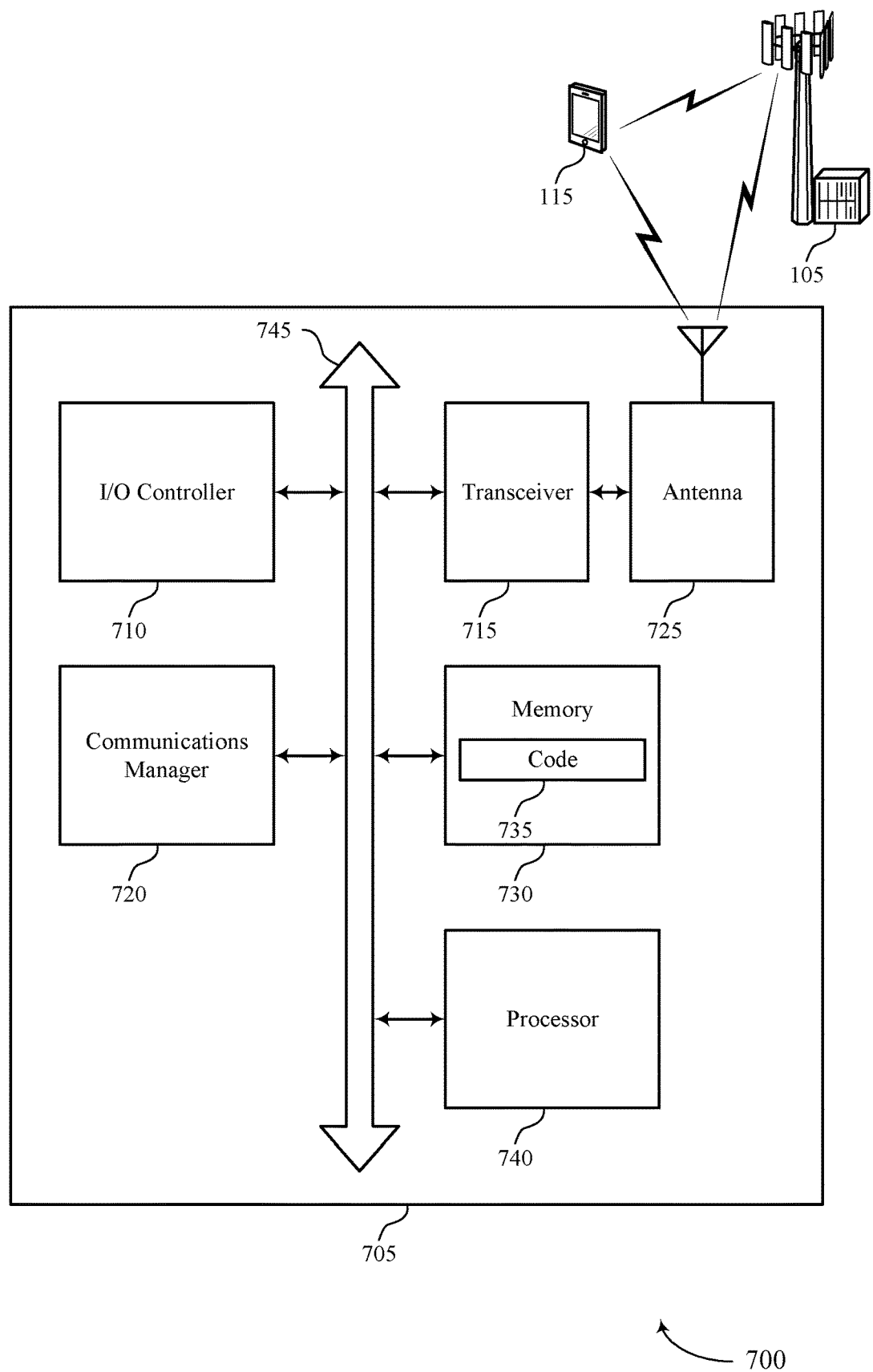
FIG. 7 shows a diagram of a system including a device that supports beam indications for multiple uplink or downlink channels and reference signals in accordance with aspects of the present disclosure.

FIG. 7 shows a diagram of a system 700 including a device 705 that supports beam indications for multiple uplink or downlink channels and reference signals in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting beam indications for multiple uplink or downlink channels and reference signals). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a message including first TCI state information and second TCI state information different from the first TCI state information, where the first TCI state information is associated with a set of multiple uplink resources and where the second TCI state information is associated with a set of multiple downlink resources. The communications manager 720 may be configured as or otherwise support a means for identifying two or more channels, or reference signals, or any combination thereof, to which a TCI state is to be applied. In some examples, the two or more channels including two or more uplink channels indicated within the first TCI state information or two or more downlink channels indicated within the second TCI state information. In some cases, the TCI state may correspond to one or more source reference signals associated with QCL assumptions for the two or more channels, or the reference signals, or any combination thereof. The communications manager 720 may be configured as or otherwise support a means for determining common beam information for the set of multiple uplink resources or the set of multiple downlink resources based on applying the TCI state to the two or more channels, or the reference signals, or any combination thereof.

By including or configuring the communications manager 720 in accordance with examples as described herein, the device 705 may support techniques for reduced processing, reduced network or signal overhead, reduced latency, or more efficient communications, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of beam indications for multiple uplink or downlink channels and reference signals as described herein, or the processor 740 and the memory 730 may be otherwise configured to perform or support such operations.

Figure 8:
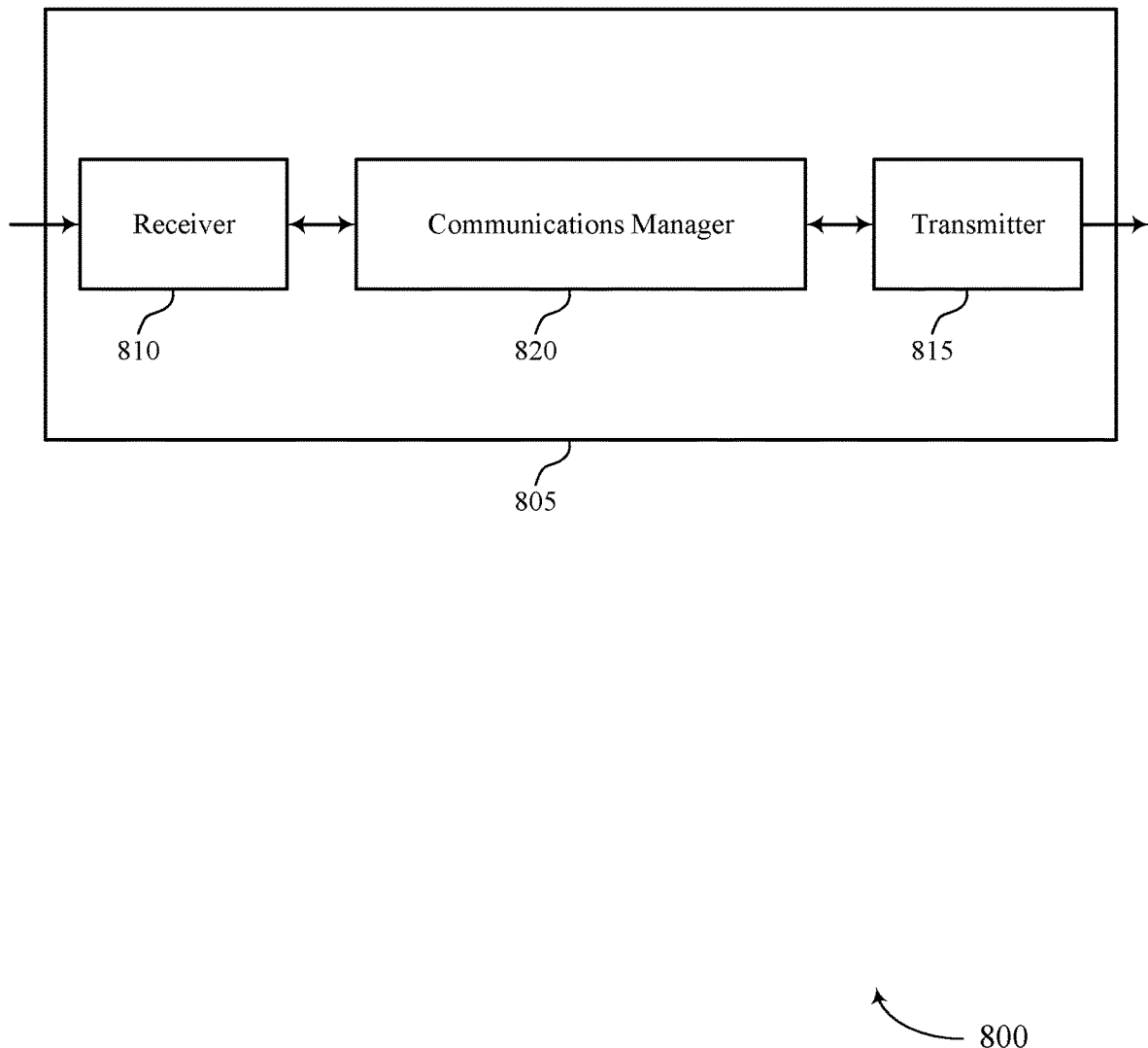
FIGS. 8 and 9 show block diagrams of devices that support beam indications for multiple uplink or downlink channels and reference signals in accordance with aspects of the present disclosure.

FIG. 8 shows a block diagram 800 of a device 805 that supports beam indications for multiple uplink or downlink channels and reference signals in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to beam indications for multiple uplink or downlink channels and reference signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to beam indications for multiple uplink or downlink channels and reference signals). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of beam indications for multiple uplink or downlink channels and reference signals as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for determining common beam information for a set of multiple uplink resources and a set of multiple downlink resources. The communications manager 820 may be configured as or otherwise support a means for configuring two or more channels, or reference signals, or any combination thereof, to which a TCI state is to be applied based on the common beam information, the two or more channels including two or more uplink channels indicated within first TCI state information or two or more downlink channels indicated within second TCI state information, where the TCI state corresponds to one or more source reference signals associated with QCL assumptions for the two or more channels, or the reference signals, or any combination thereof. The communications manager 820 may be configured as or otherwise support a means for transmitting, to a UE, a message including the first TCI state information and the second TCI state information different from the first TCI state information, where the first TCI state information is associated with the set of multiple uplink resources and where the second TCI state information is associated with the set of multiple downlink resources.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced network or signal overhead, reduced latency, or more efficient communications, among other benefits.

Figure 9:
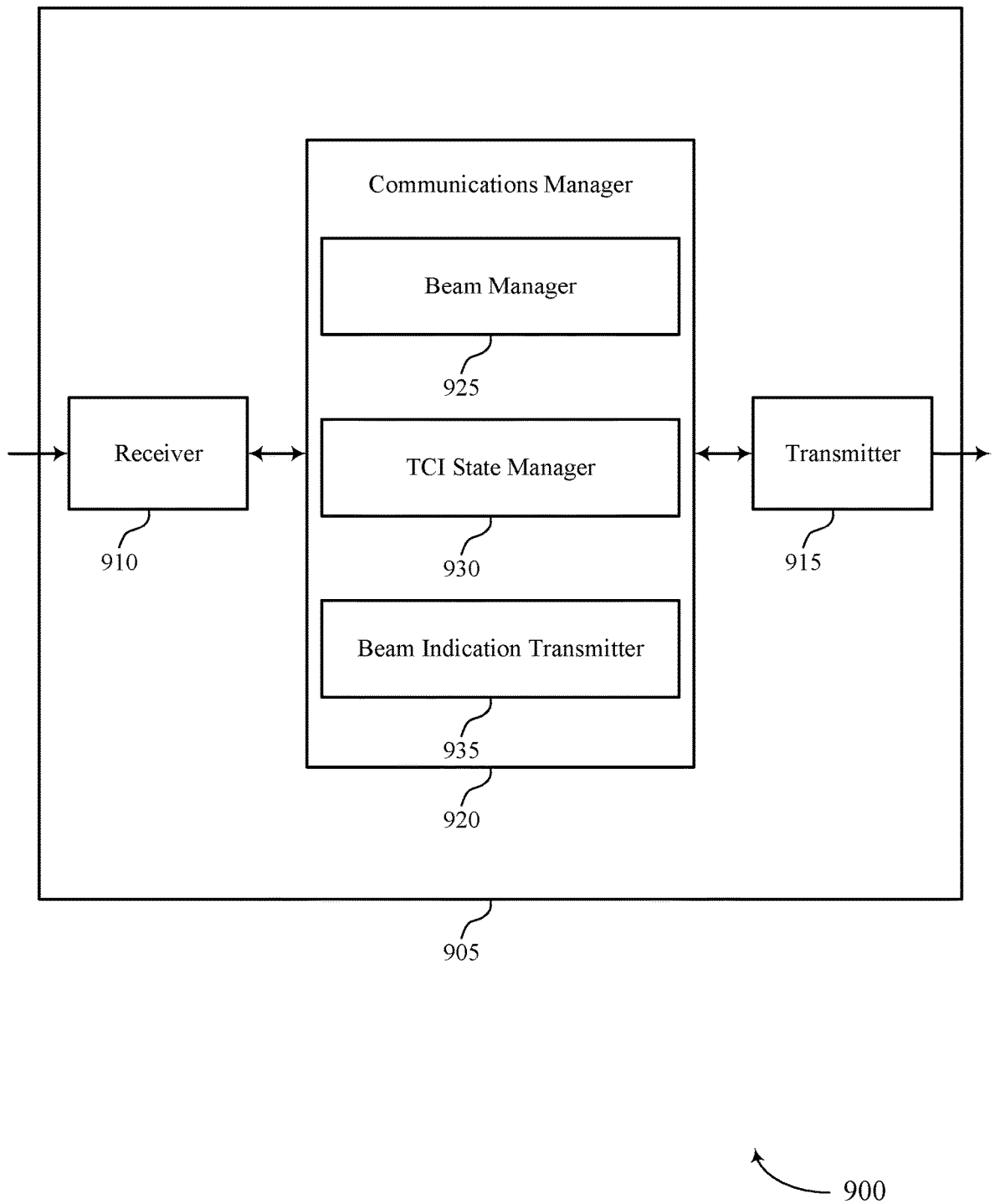

FIG. 9 shows a block diagram 900 of a device 905 that supports beam indications for multiple uplink or downlink channels and reference signals in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to beam indications for multiple uplink or downlink channels and reference signals). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to beam indications for multiple uplink or downlink channels and reference signals). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of beam indications for multiple uplink or downlink channels and reference signals as described herein. For example, the communications manager 920 may include a beam manager 925, a TCI state manager 930, a beam indication transmitter 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The beam manager 925 may be configured as or otherwise support a means for determining common beam information for a set of multiple uplink resources and a set of multiple downlink resources. The TCI state manager 930 may be configured as or otherwise support a means for configuring two or more channels, or reference signals, or any combination thereof, to which a TCI state is to be applied based on the common beam information, the two or more channels including two or more uplink channels indicated within first TCI state information or two or more downlink channels indicated within second TCI state information, where the TCI state corresponds to one or more source reference signals associated with QCL assumptions for the two or more channels, or the reference signals, or any combination thereof. The beam indication transmitter 935 may be configured as or otherwise support a means for transmitting, to a UE, a message including the first TCI state information and the second TCI state information different from the first TCI state information, where the first TCI state information is associated with the set of multiple uplink resources and where the second TCI state information is associated with the set of multiple downlink resources.

Figure 10:
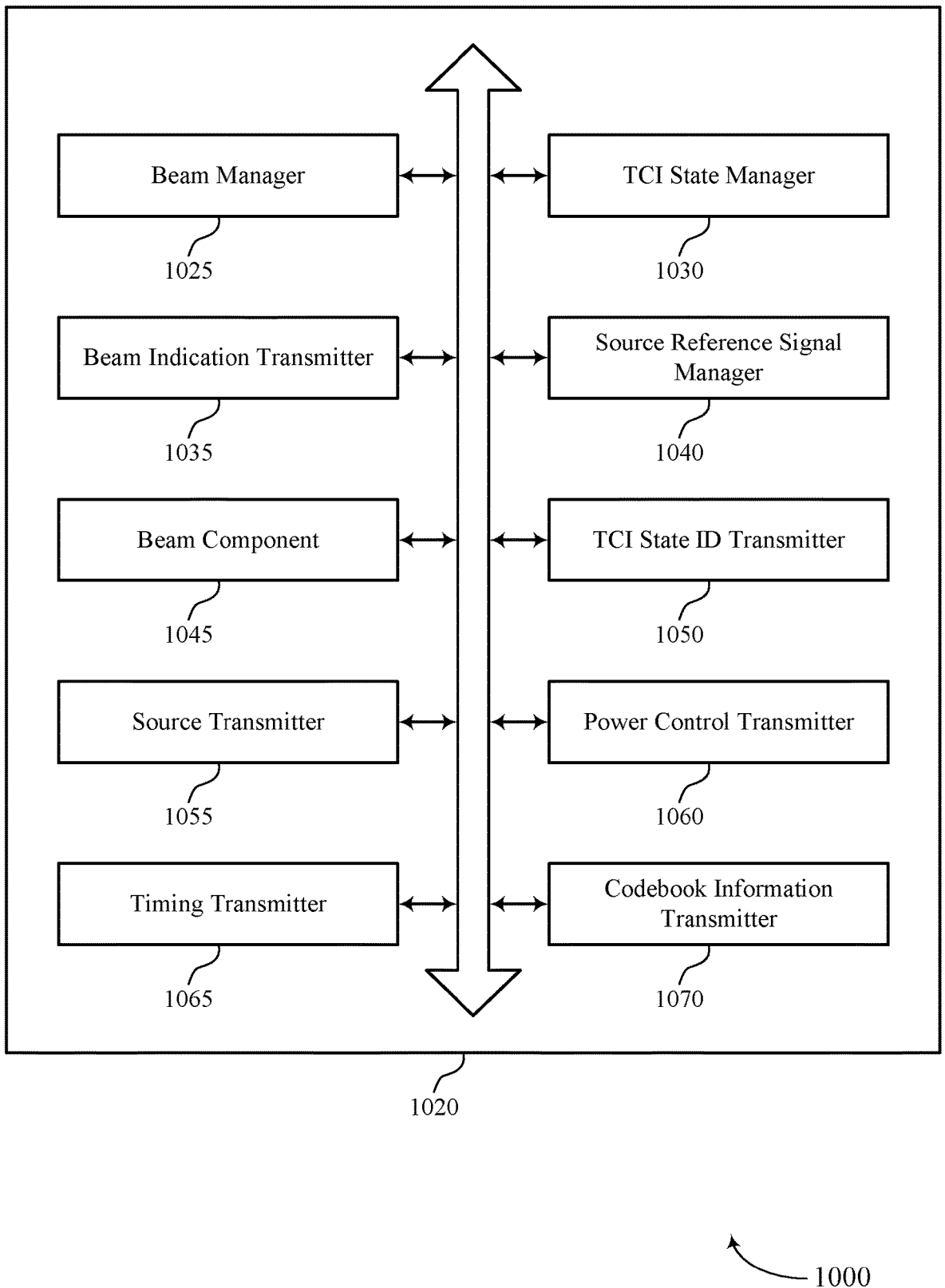
FIG. 10 shows a block diagram of a communications manager that supports beam indications for multiple uplink or downlink channels and reference signals in accordance with aspects of the present disclosure.

FIG. 10 shows a block diagram 1000 of a communications manager 1020 that supports beam indications for multiple uplink or downlink channels and reference signals in accordance with aspects of the present disclosure. The communications manager 1020 may be an example of aspects of a communications manager 820, a communications manager 920, or both, as described herein. The communications manager 1020, or various components thereof, may be an example of means for performing various aspects of beam indications for multiple uplink or downlink channels and reference signals as described herein. For example, the communications manager 1020 may include a beam manager 1025, a TCI state manager 1030, a beam indication transmitter 1035, a source reference signal manager 1040, a beam component 1045, a TCI state ID transmitter 1050, a source transmitter 1055, a power control transmitter 1060, a timing transmitter 1065, a codebook information transmitter 1070, or any combination thereof. Each of these components may communicate, directly or indirectly, with one another (e.g., via one or more buses).

The communications manager 1020 may support wireless communication at a base station in accordance with examples as disclosed herein. The beam manager 1025 may be configured as or otherwise support a means for determining common beam information for a set of multiple uplink resources and a set of multiple downlink resources. The TCI state manager 1030 may be configured as or otherwise support a means for configuring two or more channels, or reference signals, or any combination thereof, to which a TCI state is to be applied based on the common beam information, the two or more channels including two or more uplink channels indicated within first TCI state information or two or more downlink channels indicated within second TCI state information, where the TCI state corresponds to one or more source reference signals associated with QCL assumptions for the two or more channels, or the reference signals, or any combination thereof. The beam indication transmitter 1035 may be configured as or otherwise support a means for transmitting, to a UE, a message including the first TCI state information and the second TCI state information different from the first TCI state information, where the first TCI state information is associated with the set of multiple uplink resources and where the second TCI state information is associated with the set of multiple downlink resources.

In some examples, the source reference signal manager 1040 may be configured as or otherwise support a means for configuring a same source reference signal for the QCL assumptions for each of the two or more channels, or the reference signals, or any combination thereof, based on the TCI state, where the common beam information includes a common beam that corresponds to the same source reference signal. In some examples, the beam component 1045 may be configured as or otherwise support a means for communicating with the UE over the two or more channels using the common beam.

In some examples, the source reference signal manager 1040 may be configured as or otherwise support a means for configuring different source reference signals for the QCL assumptions for each of the two or more channels, or the reference signals, or any combination thereof, based on the TCI state, where the common beam information includes a first beam and a second beam, the first beam corresponding to a first source reference signal and a first channel of the two or more channels or a first reference signal of the reference signals, and where the second beam corresponds to a second source reference signal and a second channel of the two or more channels or a second reference signal of the reference signals. In some examples, the beam component 1045 may be configured as or otherwise support a means for communicating with the UE over the first channel using the first beam and over the second channel using the second beam, where the first beam and the second beam include different beams oriented in a substantially same direction.

In some examples, the TCI state ID transmitter 1050 may be configured as or otherwise support a means for transmitting, within the first TCI state information or within the second TCI state information, an information field including a TCI state identity corresponding to the TCI state, where the information field includes a dedicated field for indicating one or more common beams, a common field for indicating common uplink and downlink beam information, a field for indicating downlink beam information, a field for indicating uplink beam information, or any combination thereof.

In some examples, the source transmitter 1055 may be configured as or otherwise support a means for transmitting, within the first TCI state information or within the second TCI state information, one or more QCL information fields that indicate the one or more source reference signals for the QCL assumptions for the two or more channels, or the reference signals, or any combination thereof.

In some examples, each source reference signal of the one or more source reference signals indicates one or more QCL types. In some examples, the one or more QCL types are associated with a set of parameters including a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

In some examples, the power control transmitter 1060 may be configured as or otherwise support a means for transmitting, within the first TCI state information, a set of uplink power control parameters associated with the set of multiple uplink resources, where the set of uplink power control parameters includes a pathloss reference signal, a target receive power parameter, a pathloss compensation factor, a closed loop index, a power control group identity, or any combination thereof.

In some examples, the timing transmitter 1065 may be configured as or otherwise support a means for transmitting, within the first TCI state information, a set of timing advance parameters associated with the set of multiple uplink resources, where the set of timing advance parameters includes a timing advance group identity, a timing advance value, or both.

In some examples, the codebook information transmitter 1070 may be configured as or otherwise support a means for transmitting, within the first TCI state information, a set of parameters associated with codebook-based transmissions on the set of multiple uplink resources, or non-codebook-based transmissions on the set of multiple uplink resources, or both, where the set of parameters includes a sounding reference signal resource indicator, a transmission precoding matrix indicator, a transmission rank indicator, or any combination thereof.

Figure 11:
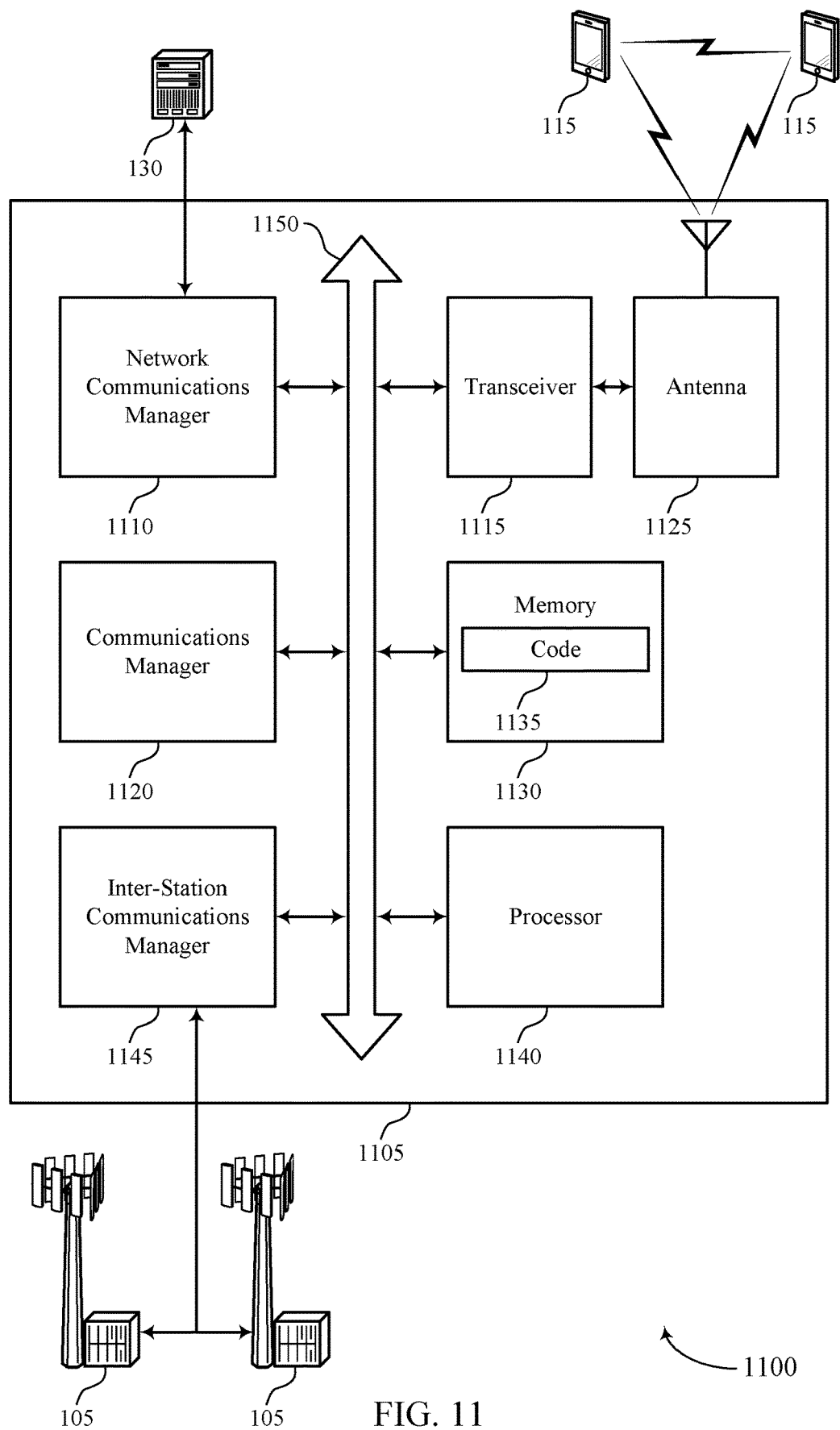
FIG. 11 shows a diagram of a system including a device that supports beam indications for multiple uplink or downlink channels and reference signals in accordance with aspects of the present disclosure.

FIG. 11 shows a diagram of a system 1100 including a device 1105 that supports beam indications for multiple uplink or downlink channels and reference signals in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam indications for multiple uplink or downlink channels and reference signals). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for determining common beam information for a set of multiple uplink resources and a set of multiple downlink resources. The communications manager 1120 may be configured as or otherwise support a means for configuring two or more channels, or reference signals, or any combination thereof, to which a TCI state is to be applied based on the common beam information, the two or more channels including two or more uplink channels indicated within first TCI state information or two or more downlink channels indicated within second TCI state information, where the TCI state corresponds to one or more source reference signals associated with QCL assumptions for the two or more channels, or the reference signals, or any combination thereof. The communications manager 1120 may be configured as or otherwise support a means for transmitting, to a UE, a message including the first TCI state information and the second TCI state information different from the first TCI state information, where the first TCI state information is associated with the set of multiple uplink resources and where the second TCI state information is associated with the set of multiple downlink resources.

By including or configuring the communications manager 1120 in accordance with examples as described herein, the device 1105 may support techniques for reduced processing, reduced network or signal overhead, reduced latency, or more efficient communications, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of beam indications for multiple uplink or downlink channels and reference signals as described herein, or the processor 1140 and the memory 1130 may be otherwise configured to perform or support such operations.

Figure 12:
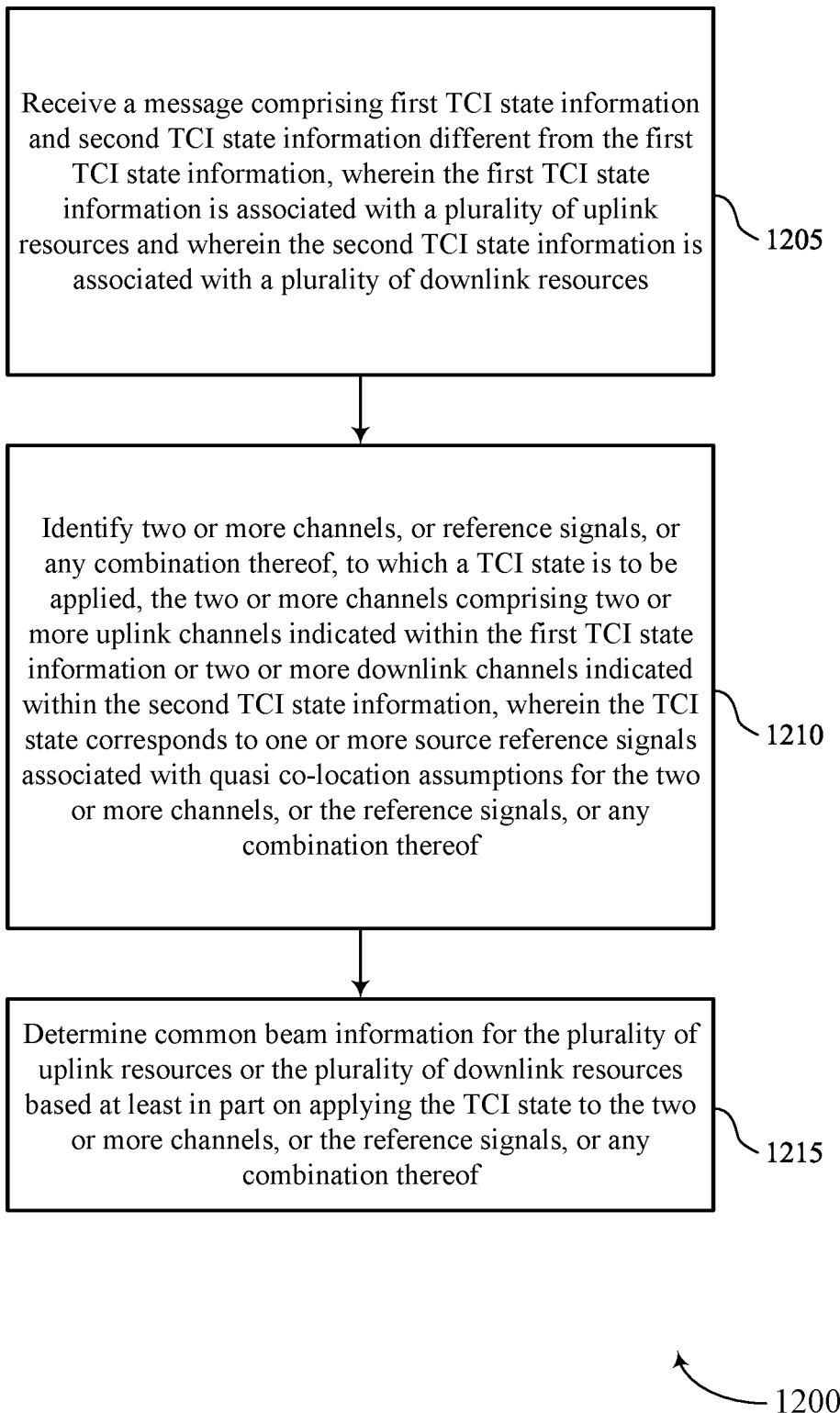
FIGS. 12 through 15 show flowcharts illustrating methods that support beam indications for multiple uplink or downlink channels and reference signals in accordance with aspects of the present disclosure.

FIG. 12 shows a flowchart illustrating a method 1200 that supports beam indications for multiple uplink or downlink channels and reference signals in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving a message including first TCI state information and second TCI state information different from the first TCI state information, where the first TCI state information is associated with a set of multiple uplink resources and where the second TCI state information is associated with a set of multiple downlink resources. The operations of 1205 may be performed in accordance with examples as disclosed herein. In some examples, aspects of the operations of 1205 may be performed by a beam indication manager 625 as described with reference to FIG. 6.

At 1210, the method may include identifying two or more channels, or reference signals, or any combination thereof, to which a TCI state is to be applied, the two or more channels including two or more uplink channels indicated within the first TCI state information or two or more downlink channels indicated within the second TCI state information, where the TCI state corresponds to one or more source reference signals associated with QCL assumptions for the two or more channels, or the reference signals, or any combination thereof. The operations of 1210 may be performed in accordance with examples as disclosed herein. In some examples, aspects of the operations of 1210 may be performed by a TCI state manager 630 as described with reference to FIG. 6.

At 1215, the method may include determining common beam information for the set of multiple uplink resources or the set of multiple downlink resources based on applying the TCI state to the two or more channels, or the reference signals, or any combination thereof. The operations of 1215 may be performed in accordance with examples as disclosed herein. In some examples, aspects of the operations of 1215 may be performed by a beam manager 635 as described with reference to FIG. 6.

Figure 13:
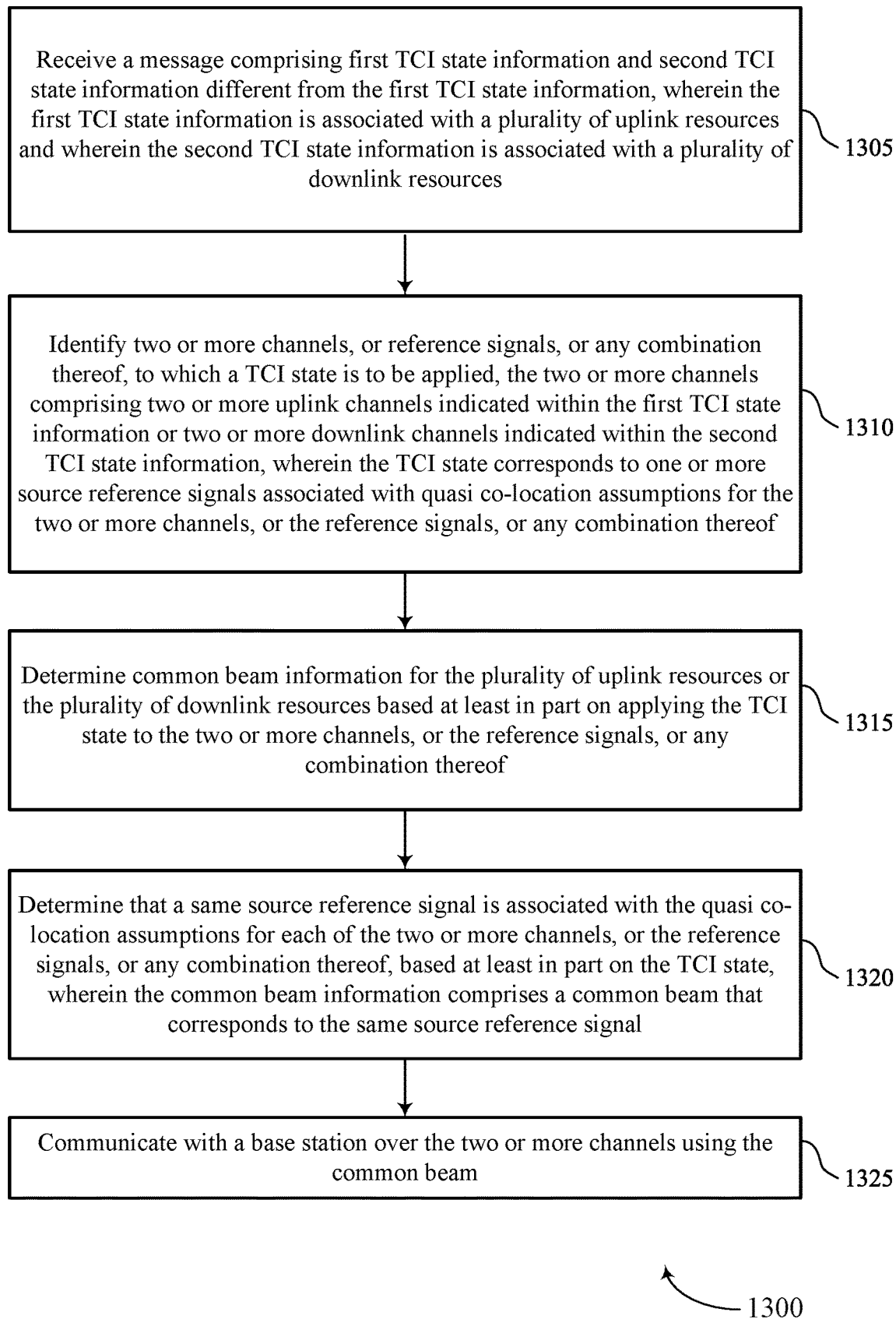

FIG. 13 shows a flowchart illustrating a method 1300 that supports beam indications for multiple uplink or downlink channels and reference signals in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving a message including first TCI state information and second TCI state information different from the first TCI state information, where the first TCI state information is associated with a set of multiple uplink resources and where the second TCI state information is associated with a set of multiple downlink resources. The operations of 1305 may be performed in accordance with examples as disclosed herein. In some examples, aspects of the operations of 1305 may be performed by a beam indication manager 625 as described with reference to FIG. 6.

At 1310, the method may include identifying two or more channels, or reference signals, or any combination thereof, to which a TCI state is to be applied, the two or more channels including two or more uplink channels indicated within the first TCI state information or two or more downlink channels indicated within the second TCI state information, where the TCI state corresponds to one or more source reference signals associated with QCL assumptions for the two or more channels, or the reference signals, or any combination thereof. The operations of 1310 may be performed in accordance with examples as disclosed herein. In some examples, aspects of the operations of 1310 may be performed by a TCI state manager 630 as described with reference to FIG. 6.

At 1315, the method may include determining common beam information for the set of multiple uplink resources or the set of multiple downlink resources based on applying the TCI state to the two or more channels, or the reference signals, or any combination thereof. The operations of 1315 may be performed in accordance with examples as disclosed herein. In some examples, aspects of the operations of 1315 may be performed by a beam manager 635 as described with reference to FIG. 6.

At 1320, the method may include determining that a same source reference signal is associated with the QCL assumptions for each of the two or more channels, or the reference signals, or any combination thereof, based on the TCI state, where the common beam information includes a common beam that corresponds to the same source reference signal. The operations of 1320 may be performed in accordance with examples as disclosed herein. In some examples, aspects of the operations of 1320 may be performed by a source reference signal manager 640 as described with reference to FIG. 6.

At 1325, the method may include communicating with a base station over the two or more channels using the common beam. The operations of 1325 may be performed in accordance with examples as disclosed herein. In some examples, aspects of the operations of 1325 may be performed by a beam component 645 as described with reference to FIG. 6.

Figure 14:
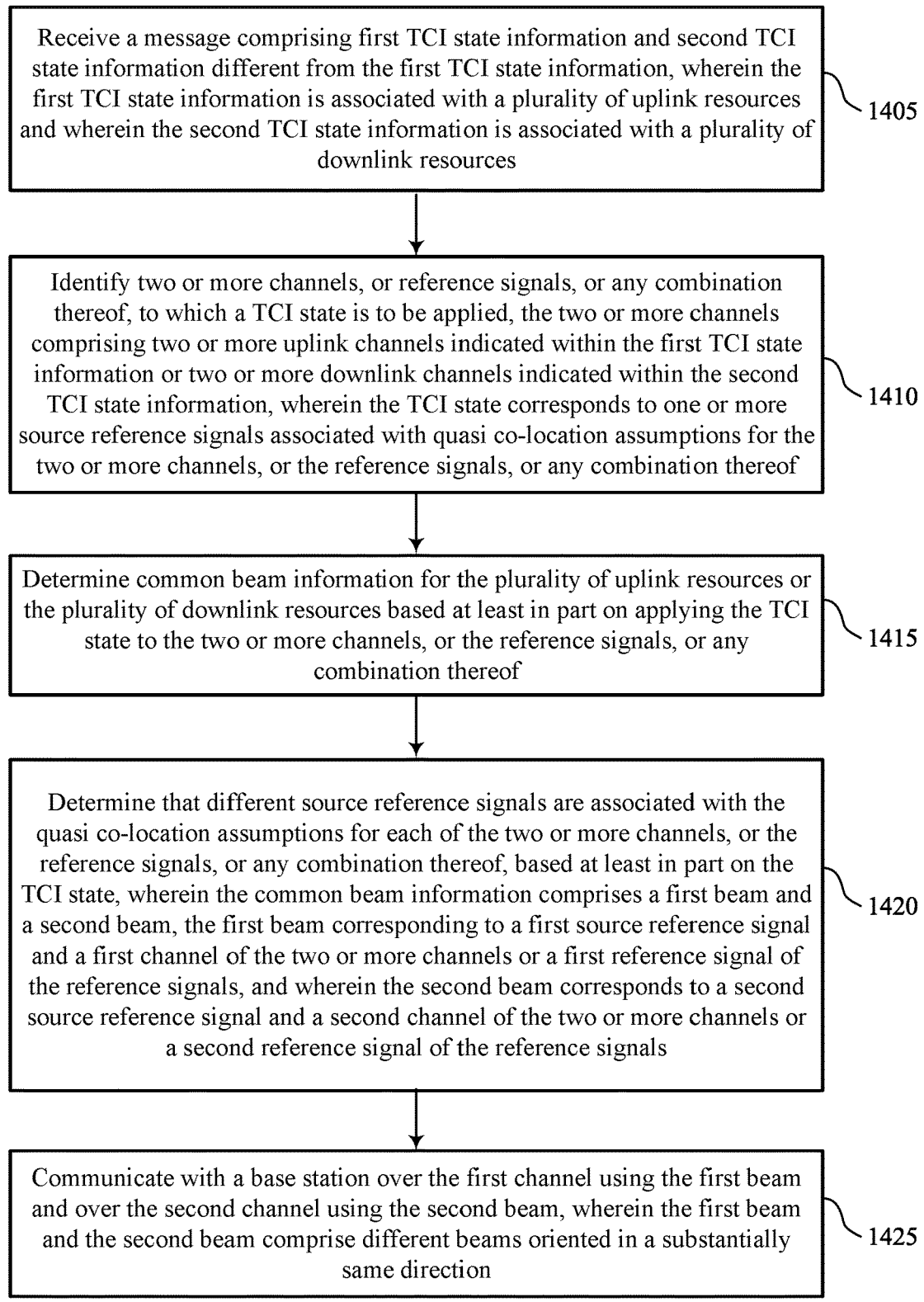

FIG. 14 shows a flowchart illustrating a method 1400 that supports beam indications for multiple uplink or downlink channels and reference signals in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving a message including first TCI state information and second TCI state information different from the first TCI state information, where the first TCI state information is associated with a set of multiple uplink resources and where the second TCI state information is associated with a set of multiple downlink resources. The operations of 1405 may be performed in accordance with examples as disclosed herein. In some examples, aspects of the operations of 1405 may be performed by a beam indication manager 625 as described with reference to FIG. 6.

At 1410, the method may include identifying two or more channels, or reference signals, or any combination thereof, to which a TCI state is to be applied, the two or more channels including two or more uplink channels indicated within the first TCI state information or two or more downlink channels indicated within the second TCI state information, where the TCI state corresponds to one or more source reference signals associated with QCL assumptions for the two or more channels, or the reference signals, or any combination thereof. The operations of 1410 may be performed in accordance with examples as disclosed herein. In some examples, aspects of the operations of 1410 may be performed by a TCI state manager 630 as described with reference to FIG. 6.

At 1415, the method may include determining common beam information for the set of multiple uplink resources or the set of multiple downlink resources based on applying the TCI state to the two or more channels, or the reference signals, or any combination thereof. The operations of 1415 may be performed in accordance with examples as disclosed herein. In some examples, aspects of the operations of 1415 may be performed by a beam manager 635 as described with reference to FIG. 6.

At 1420, the method may include determining that different source reference signals are associated with the QCL assumptions for each of the two or more channels, or the reference signals, or any combination thereof, based on the TCI state, where the common beam information includes a first beam and a second beam, the first beam corresponding to a first source reference signal and a first channel of the two or more channels or a first reference signal of the reference signals, and where the second beam corresponds to a second source reference signal and a second channel of the two or more channels or a second reference signal of the reference signals. The operations of 1420 may be performed in accordance with examples as disclosed herein. In some examples, aspects of the operations of 1420 may be performed by a source reference signal manager 640 as described with reference to FIG. 6.

At 1425, the method may include communicating with a base station over the first channel using the first beam and over the second channel using the second beam, where the first beam and the second beam include different beams oriented in a substantially same direction. The operations of 1425 may be performed in accordance with examples as disclosed herein. In some examples, aspects of the operations of 1425 may be performed by a beam component 645 as described with reference to FIG. 6.

Figure 15:
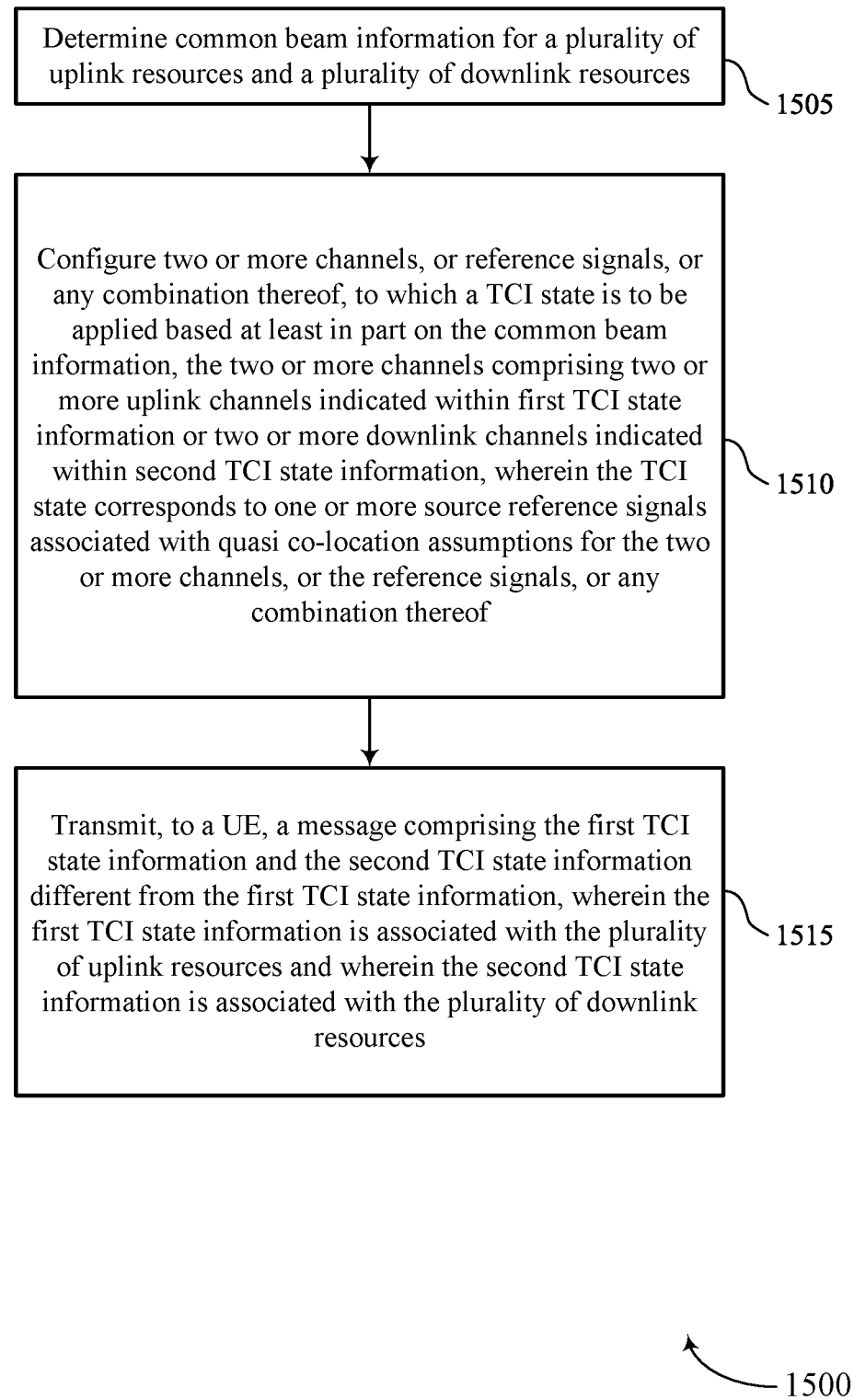

FIG. 15 shows a flowchart illustrating a method 1500 that supports beam indications for multiple uplink or downlink channels and reference signals in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include determining common beam information for a set of multiple uplink resources and a set of multiple downlink resources. The operations of 1505 may be performed in accordance with examples as disclosed herein. In some examples, aspects of the operations of 1505 may be performed by a beam manager 1025 as described with reference to FIG. 10.

At 1510, the method may include configuring two or more channels, or reference signals, or any combination thereof, to which a TCI state is to be applied based on the common beam information, the two or more channels including two or more uplink channels indicated within first TCI state information or two or more downlink channels indicated within second TCI state information, where the TCI state corresponds to one or more source reference signals associated with QCL assumptions for the two or more channels, or the reference signals, or any combination thereof. The operations of 1510 may be performed in accordance with examples as disclosed herein. In some examples, aspects of the operations of 1510 may be performed by a TCI state manager 1030 as described with reference to FIG. 10.

At 1515, the method may include transmitting, to a UE, a message including the first TCI state information and the second TCI state information different from the first TCI state information, where the first TCI state information is associated with the set of multiple uplink resources and where the second TCI state information is associated with the set of multiple downlink resources. The operations of 1515 may be performed in accordance with examples as disclosed herein. In some examples, aspects of the operations of 1515 may be performed by a beam indication transmitter 1035 as described with reference to FIG. 10.

The following provides an overview of aspects of the present disclosure:

Aspect 1: A method for wireless communication at a UE, comprising: receiving a message comprising first transmission configuration indicator state information and second transmission configuration indicator state information different from the first transmission configuration indicator state information, wherein the first transmission configuration indicator state information is associated with a plurality of uplink resources and wherein the second transmission configuration indicator state information is associated with a plurality of downlink resources; identifying two or more channels, or reference signals, or any combination thereof, to which a transmission configuration indicator state is to be applied, the two or more channels comprising two or more uplink channels indicated within the first transmission configuration indicator state information or two or more downlink channels indicated within the second transmission configuration indicator state information, wherein the transmission configuration indicator state corresponds to one or more source reference signals associated with quasi co-location assumptions for the two or more channels, or the reference signals, or any combination thereof; and determining common beam information for the plurality of uplink resources or the plurality of downlink resources based at least in part on applying the transmission configuration indicator state to the two or more channels, or the reference signals, or any combination thereof.

Aspect 2: The method of aspect 1, further comprising: determining that a same source reference signal is associated with the quasi co-location assumptions for each of the two or more channels, or the reference signals, or any combination thereof, based at least in part on the transmission configuration indicator state, wherein the common beam information comprises a common beam that corresponds to the same source reference signal; and communicating with a base station over the two or more channels using the common beam.

Aspect 3: The method of any of aspects 1 through 2, further comprising: determining that different source reference signals are associated with the quasi co-location assumptions for each of the two or more channels, or the reference signals, or any combination thereof, based at least in part on the transmission configuration indicator state, wherein the common beam information comprises a first beam and a second beam, the first beam corresponding to a first source reference signal and a first channel of the two or more channels or a first reference signal of the reference signals, and wherein the second beam corresponds to a second source reference signal and a second channel of the two or more channels or a second reference signal of the reference signals; and communicating with a base station over the first channel using the first beam and over the second channel using the second beam, wherein the first beam and the second beam comprise different beams oriented in a substantially same direction.

Aspect 4: The method of any of aspects 1 through 3, further comprising: identifying the transmission configuration indicator state based at least in part on an information field comprising a transmission configuration indicator state identity corresponding to the transmission configuration indicator state, wherein the information field is within the first transmission configuration indicator state information or within the second transmission configuration indicator state information.

Aspect 5: The method of aspect 4, wherein the information field comprises a dedicated field for indicating one or more common beams, a common field for indicating common uplink and downlink beam information, a field for indicating downlink beam information, a field for indicating uplink beam information, or any combination thereof.

Aspect 6: The method of any of aspects 1 through 5, further comprising: identifying the one or more source reference signals based at least in part on one or more quasi co-location information fields, wherein the one or more quasi co-location information fields are indicated within the first transmission configuration indicator state information or the second transmission configuration indicator state information.

Aspect 7: The method of any of aspects 1 through 6, wherein each source reference signal of the one or more source reference signals indicates one or more quasi co-location types, the one or more quasi co-location types are associated with a set of parameters comprising a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

Aspect 8: The method of aspect 7, further comprising: determining that the one or more source reference signals indicate combinations of the one or more quasi co-location types, or the set of parameters, or both, wherein the quasi co-location assumptions for the two or more channels, or the reference signals, or any combination thereof, are based at least in part on the determination.

Aspect 9: The method of any of aspects 1 through 8, further comprising: determining that a source reference signal of the one or more source reference signals corresponds to a plurality of quasi co-location assumptions for the two or more channels, or the reference signals, or any combination thereof, wherein the quasi co-location assumptions for the two or more channels, or the reference signals, or any combination thereof, are based at least in part on the determination.

Aspect 10: The method of any of aspects 1 through 9, further comprising: identifying a location of each source reference signal of the one or more source reference signals, the location being indicated within the first transmission configuration indicator state information or the second transmission configuration indicator state information, wherein the location is based at least in part on an indication of a serving cell identity, or a bandwidth part identity, or both.

Aspect 11: The method of any of aspects 1 through 10, further comprising: determining that the transmission configuration indicator state for the two or more channels, or the reference signals, or any combination thereof, indicates a plurality of beams, wherein a first set of source reference signals from the one or more source reference signals indicates a first beam of the plurality of beams, a first channel of the two or more channels, a first reference signal of the reference signals, or any combination thereof, and wherein a second set of source reference signals from the one or more source reference signals indicates a second beam of the plurality of beams, a second channel of the two or more channels, a second reference signal of the reference signals, or any combination thereof, the second set of source reference signals being different from the first set of source reference signals.

Aspect 12: The method of any of aspects 1 through 11, further comprising: identifying a set of power control parameters associated with the plurality of uplink resources, the set of power control parameters being identified within the first transmission configuration indicator state information, wherein the set of power control parameters comprises a pathloss reference signal, a target receive power parameter, a path-loss compensation factor, a closed loop index, a power control group identity, or any combination thereof; and applying the set of power control parameters to an uplink transmission based at least in part on the transmission configuration indicator state.

Aspect 13: The method of aspect 12, further comprising: determining that the transmission configuration indicator state indicates two or more beams for the uplink transmission, wherein a first subset of the set of power control parameters is applied to a first beam of the two or more beams and a second subset of the set of power control parameters is applied to a second beam of the two or more beams.

Aspect 14: The method of any of aspects 1 through 13, further comprising: identifying a set of timing advance parameters associated with the plurality of uplink resources, the set of timing advance parameters being identified within the first transmission configuration indicator state information, wherein the set of timing advance parameters comprises a timing advance group identity, a timing advance value, or both; and applying the set of timing advance parameters to an uplink transmission based at least in part on the transmission configuration indicator state.

Aspect 15: The method of aspect 14, further comprising: determining that the transmission configuration indicator state indicates two or more beams for the uplink transmission, wherein a first subset of the set of timing advance parameters is applied to a first beam of the two or more beams and a second subset of the set of timing advance parameters is applied to a second beam of the two or more beams.

Aspect 16: The method of any of aspects 1 through 15, further comprising: identifying a set of parameters associated with codebook-based transmissions on the plurality of uplink resources, or non-codebook-based transmissions on the plurality of uplink resources, or both, the set of parameters being identified within the first transmission configuration indicator state information, wherein the set of parameters comprises a sounding reference signal resource indicator, a transmission precoding matrix indicator, a transmission rank indicator, or any combination thereof; and applying the set of parameters to an uplink transmission based at least in part on the transmission configuration indicator state.

Aspect 17: The method of aspect 16, further comprising: determining that the transmission configuration indicator state indicates two or more beams, the two or more channels, or the reference signals, or any combination thereof, for the uplink transmission, wherein a first subset of the set of parameters is applied to a first beam of the two or more beams and a second subset of the set of parameters is applied to a second beam of the two or more beams.

Aspect 18: The method of any of aspects 1 through 17, further comprising: identifying one or more antenna panel identifiers associated with respective antenna panels of the UE, the one or more antenna panel identifiers being identified within the first transmission configuration indicator state information, wherein the respective antenna panels of the UE are associated with transmitting over a same or different channel of the two or more uplink channels based at least in part on the transmission configuration indicator state.

Aspect 19: The method of any of aspects 1 through 18, wherein each of the two or more channels are associated with a respective demodulation reference signal indicated within the first transmission configuration indicator state information being or the second transmission configuration indicator state information; and the one or more source reference signals comprise a synchronization signal block, a channel state information reference signal, a sounding reference signal, a positioning reference signal, a reference signal associated with a physical random access channel, a demodulation reference signal associated with a physical downlink control channel, a demodulation reference signal associated with a physical downlink shared channel, a demodulation reference signal associated with a physical uplink shared channel, a demodulation reference signal associated with a physical uplink control channel, or any combination thereof.

Aspect 20: A method for wireless communication at a base station, comprising: determining common beam information for a plurality of uplink resources and a plurality of downlink resources; configuring two or more channels, or reference signals, or any combination thereof, to which a transmission configuration indicator state is to be applied based at least in part on the common beam information, the two or more channels comprising two or more uplink channels indicated within first transmission configuration indicator state information or two or more downlink channels indicated within second transmission configuration indicator state information, wherein the transmission configuration indicator state corresponds to one or more source reference signals associated with quasi co-location assumptions for the two or more channels, or the reference signals, or any combination thereof; and transmitting, to a UE, a message comprising the first transmission configuration indicator state information and the second transmission configuration indicator state information different from the first transmission configuration indicator state information, wherein the first transmission configuration indicator state information is associated with the plurality of uplink resources and wherein the second transmission configuration indicator state information is associated with the plurality of downlink resources.

Aspect 21: The method of aspect 20, further comprising: configuring a same source reference signal for the quasi co-location assumptions for each of the two or more channels, or the reference signals, or any combination thereof, based at least in part on the transmission configuration indicator state, wherein the common beam information comprises a common beam that corresponds to the same source reference signal; and communicating with the UE over the two or more channels using the common beam.

Aspect 22: The method of any of aspects 20 through 21, further comprising: configuring different source reference signals for the quasi co-location assumptions for each of the two or more channels, or the reference signals, or any combination thereof, based at least in part on the transmission configuration indicator state, wherein the common beam information comprises a first beam and a second beam, the first beam corresponding to a first source reference signal and a first channel of the two or more channels or a first reference signal of the reference signals, and wherein the second beam corresponds to a second source reference signal and a second channel of the two or more channels or a second reference signal of the reference signals; and communicating with the UE over the first channel using the first beam and over the second channel using the second beam, wherein the first beam and the second beam comprise different beams oriented in a substantially same direction.

Aspect 23: The method of any of aspects 20 through 22, further comprising: transmitting, within the first transmission configuration indicator state information or within the second transmission configuration indicator state information, an information field comprising a transmission configuration indicator state identity corresponding to the transmission configuration indicator state, wherein the information field comprises a dedicated field for indicating one or more common beams, a common field for indicating common uplink and downlink beam information, a field for indicating downlink beam information, a field for indicating uplink beam information, or any combination thereof.

Aspect 24: The method of any of aspects 20 through 23, further comprising: transmitting, within the first transmission configuration indicator state information or within the second transmission configuration indicator state information, one or more quasi co-location information fields that indicate the one or more source reference signals for the quasi co-location assumptions for the two or more channels, or the reference signals, or any combination thereof.

Aspect 25: The method of any of aspects 20 through 24, wherein each source reference signal of the one or more source reference signals indicates one or more quasi co-location types, the one or more quasi co-location types are associated with a set of parameters comprising a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

Aspect 26: The method of any of aspects 20 through 25, further comprising: transmitting, within the first transmission configuration indicator state information, a set of uplink power control parameters associated with the plurality of uplink resources, wherein the set of uplink power control parameters comprises a pathloss reference signal, a target receive power parameter, a path-loss compensation factor, a closed loop index, a power control group identity, or any combination thereof.

Aspect 27: The method of any of aspects 20 through 26, further comprising: transmitting, within the first transmission configuration indicator state information, a set of timing advance parameters associated with the plurality of uplink resources, wherein the set of timing advance parameters comprises a timing advance group identity, a timing advance value, or both.

Aspect 28: The method of any of aspects 20 through 27, further comprising: transmitting, within the first transmission configuration indicator state information, a set of parameters associated with codebook-based transmissions on the plurality of uplink resources, or non-codebook-based transmissions on the plurality of uplink resources, or both, wherein the set of parameters comprises a sounding reference signal resource indicator, a transmission precoding matrix indicator, a transmission rank indicator, or any combination thereof.

Aspect 29: An apparatus for wireless communication at a UE, comprising a processor; memory coupled with the processor; and instructions stored in the memory and executable by the processor to cause the apparatus to perform a method of any of aspects 1 through 19.

Aspect 30: An apparatus for wireless communication at a UE, comprising at least one means for performing a method of any of aspects 1 through 19.

Aspect 31: A non-transitory computer-readable medium storing code for wireless communication at a UE, the code comprising instructions executable by a processor to perform a method of any of aspects 1 through 19.

Aspect 32: An apparatus for wireless communication at a base station, comprising a processor; memory coupled with the processor; and instructions stored in the memory and executable by the processor to cause the apparatus to perform a method of any of aspects 20 through 28.

Aspect 33: An apparatus for wireless communication at a base station, comprising at least one means for performing a method of any of aspects 20 through 28.

Aspect 34: A non-transitory computer-readable medium storing code for wireless communication at a base station, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a message comprising one or more first transmission configuration indicator state information and one or more second transmission configuration indicator state information different from the one or more first transmission configuration indicator state information, wherein the one or more first transmission configuration indicator state information is associated with a plurality of uplink resources and wherein the one or more second transmission configuration indicator state information is associated with a plurality of downlink resources;
    applying respective transmission configuration indicator states to each of two or more channels, or reference signals, or any combination thereof, the respective transmission configuration indicator states corresponding to the one or more first transmission configuration indicator state information or the one or more second transmission configuration indicator state information, wherein each transmission configuration indicator state indicates a respective beam for an uplink transmission and a respective set of power control parameters associated with the two or more channels, or the reference signals, or any combination thereof, and wherein a first subset of a set of timing advance parameters is applied to a first beam of the respective beams and a second subset of the set of timing advance parameters is applied to a second beam of the respective beams; and
    determining common beam information for the plurality of uplink resources or the plurality of downlink resources based at least in part on applying the respective transmission configuration indicator states to each of the two or more channels, or the reference signals, or any combination thereof.

2. The method of claim 1, further comprising:
    determining that a same source reference signal is associated with quasi co-location assumptions for each of the two or more channels, or the reference signals, or any combination thereof, based at least in part on the respective transmission configuration indicator states, wherein the common beam information comprises a common beam that corresponds to the same source reference signal; and
    communicating with a base station over the two or more channels using the common beam.

3. The method of claim 1, further comprising:
    determining that different source reference signals are associated with quasi co- location assumptions for each of the two or more channels, or the reference signals, or any combination thereof, based at least in part on the respective transmission configuration indicator states, wherein the common beam information comprises a first beam and a second beam, the first beam corresponding to a first source reference signal and a first channel of the two or more channels or a first reference signal of the reference signals, and wherein the second beam corresponds to a second source reference signal and a second channel of the two or more channels or a second reference signal of the reference signals; and
    communicating with a base station over the first channel using the first beam and over the second channel using the second beam, wherein the first beam and the second beam comprise different beams oriented in a first direction.

4. The method of claim 1, further comprising:
    identifying the respective transmission configuration indicator states based at least in part on an information field comprising a transmission configuration indicator state identity corresponding to the respective transmission configuration indicator states, wherein the information field is within the one or more first transmission configuration indicator state information or within the one or more second transmission configuration indicator state information.

5. The method of claim 4, wherein the information field comprises a dedicated field for indicating one or more common beams, a common field for indicating common uplink and downlink beam information, a field for indicating downlink beam information, a field for indicating uplink beam information, or any combination thereof.

6. The method of claim 1, further comprising:
    identifying one or more source reference signals associated with quasi co-location assumptions for the two or more channels, or the reference signals, or any combination thereof, based at least in part on one or more quasi co-location information fields, wherein the one or more quasi co-location information fields are indicated within the one or more first transmission configuration indicator state information or the one or more second transmission configuration indicator state information.

7. The method of claim 6, wherein:
    each source reference signal of the one or more source reference signals indicates one or more quasi co-location types, and
    the one or more quasi co-location types are associated with a set of parameters comprising a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

8. The method of claim 7, further comprising:
    determining that the one or more source reference signals indicate combinations of the one or more quasi co-location types, or the set of parameters, or both, wherein the quasi co-location assumptions for the two or more channels, or the reference signals, or any combination thereof, are based at least in part on the determination that the one or more source reference signals indicate the combinations of the one or more quasi co-location types, or the set of parameters, or both.

9. The method of claim 6, further comprising:
    determining that a source reference signal of the one or more source reference signals corresponds to a plurality of quasi co-location assumptions for the two or more channels, or the reference signals, or any combination thereof, wherein the quasi co-location assumptions for the two or more channels, or the reference signals, or any combination thereof, are based at least in part on the determination that the source reference signal of the one or more source reference signals corresponds to the plurality of quasi co-location assumptions for the two or more channels, or the reference signals, or any combination thereof.

10. The method of claim 6, further comprising:
identifying a location of each source reference signal of the one or more source reference signals, the location being indicated within the one or more first transmission configuration indicator state information or the one or more second transmission configuration indicator state information, wherein the location is based at least in part on an indication of a serving cell identity, or a bandwidth part identity, or both.

11. The method of claim 6, further comprising:
determining that the respective transmission configuration indicator states for each of the two or more channels, or the reference signals, or any combination thereof, indicates a plurality of beams, wherein a first set of source reference signals from the one or more source reference signals indicates a first beam of the plurality of beams, a first channel of the two or more channels, a first reference signal of the reference signals, or any combination thereof, and wherein a second set of source reference signals from the one or more source reference signals indicates a second beam of the plurality of beams, a second channel of the two or more channels, a second reference signal of the reference signals, or any combination thereof, the second set of source reference signals being different from the first set of source reference signals.

12. The method of claim 6, wherein:
each of the two or more channels are associated with a respective demodulation reference signal indicated within the one or more first transmission configuration indicator state information being or the one or more second transmission configuration indicator state information; and
the one or more source reference signals comprise a synchronization signal block, a channel state information reference signal, a sounding reference signal, a positioning reference signal, a reference signal associated with a physical random access channel, a demodulation reference signal associated with a physical downlink control channel, a demodulation reference signal associated with a physical downlink shared channel, a demodulation reference signal associated with a physical uplink shared channel, a demodulation reference signal associated with a physical uplink control channel, or any combination thereof.

13. The method of claim 1, further comprising:
identifying the respective set of power control parameters associated with the two or more channels, or the reference signals, or any combination thereof, the respective set of power control parameters being identified within the one or more first transmission configuration indicator state information, wherein the respective set of power control parameters comprises a pathloss reference signal, a target receive power parameter, a pathloss compensation factor, a closed loop index, a power control group identity, or any combination thereof; and
applying the respective set of power control parameters to an uplink transmission based at least in part on the respective transmission configuration indicator states.

14. The method of claim 12, further comprising:
determining that the respective transmission configuration indicator states indicate two or more beams for the uplink transmission, wherein a first subset of a set of power control parameters is applied to a first beam of the two or more beams and a second subset of the set of power control parameters is applied to a second beam of the two or more beams.

15. The method of claim 1, further comprising:
identifying the set of timing advance parameters, the set of timing advance parameters being associated with the plurality of uplink resources and identified within the one or more first transmission configuration indicator state information, wherein the set of timing advance parameters comprises a timing advance group identity, a timing advance value, or both; and
applying the set of timing advance parameters to the uplink transmission based at least in part on the respective transmission configuration indicator states.

16. The method of claim 1, further comprising:
identifying a set of parameters associated with codebook-based transmissions on the plurality of uplink resources, or non-codebook-based transmissions on the plurality of uplink resources, or both, the set of parameters being identified within the one or more first transmission configuration indicator state information, wherein the set of parameters comprises a sounding reference signal resource indicator, a transmission precoding matrix indicator, a transmission rank indicator, or any combination thereof; and
applying the set of parameters to an uplink transmission based at least in part on the transmission configuration indicator state.

17. The method of claim 16, further comprising:
determining that the respective transmission configuration indicator states indicate two or more beams, the two or more channels, or the reference signals, or any combination thereof, for the uplink transmission, wherein a first subset of the set of parameters is applied to a first beam of the two or more beams and a second subset of the set of parameters is applied to a second beam of the two or more beams.

18. The method of claim 1, further comprising:
identifying one or more antenna panel identifiers associated with respective antenna panels of the UE, the one or more antenna panel identifiers being identified within the one or more first transmission configuration indicator state information, wherein the respective antenna panels of the UE are associated with transmitting over a same or different channel of two or more uplink channels indicated within the one or more first transmission configuration indicator state information based at least in part on the respective transmission configuration indicator state.

19. A method for wireless communication at a base station, comprising:
determining common beam information for a plurality of uplink resources and a plurality of downlink resources;
configuring two or more channels, or reference signals, or any combination thereof, to which respective transmission configuration indicator states are to be applied based at least in part on the common beam information, the two or more channels comprising two or more uplink channels indicated within one or more first transmission configuration indicator state information or two or more downlink channels indicated within one or more second transmission configuration indicator state information, wherein each transmission configuration indicator state indicates a respective beam for an uplink transmission and a respective set of power control parameters associated with the two or more channels, or the reference signals, or any combination thereof, and wherein a first subset of a set of timing advance parameters is applied to a first beam of the respective beams and a second subset of the set of timing advance parameters is applied to a second beam of the respective beams; and transmitting, to a user equipment (UE), a message comprising the one or more first transmission configuration indicator state information and the one or more second transmission configuration indicator state information different from the one or more first transmission configuration indicator state information, wherein the one or more first transmission configuration indicator state information is associated with the plurality of uplink resources and wherein the one or more second transmission configuration indicator state information is associated with the plurality of downlink resources.

20. The method of claim 19, further comprising:
configuring a same source reference signal for quasi co-location assumptions for each of the two or more channels, or the reference signals, or any combination thereof, based at least in part on the respective transmission configuration indicator states, wherein the common beam information comprises a common beam that corresponds to the same source reference signal; and
communicating with the UE over the two or more channels using the common beam.

21. The method of claim 19, further comprising:
configuring different source reference signals for quasi co-location assumptions for each of the two or more channels, or the reference signals, or any combination thereof, based at least in part on the respective transmission configuration indicator states, wherein the common beam information comprises a first beam and a second beam, the first beam corresponding to a first source reference signal and a first channel of the two or more channels or a first reference signal of the reference signals, and wherein the second beam corresponds to a second source reference signal and a second channel of the two or more channels or a second reference signal of the reference signals; and
communicating with the UE over the first channel using the first beam and over the second channel using the second beam, wherein the first beam and the second beam comprise different beams oriented in a first direction.

22. The method of claim 19, further comprising:
transmitting, within the one or more first transmission configuration indicator state information or within the one or more second transmission configuration indicator state information, an information field comprising a transmission configuration indicator state identity corresponding to the respective transmission configuration indicator states, wherein the information field comprises a dedicated field for indicating one or more common beams, a common field for indicating common uplink and downlink beam information, a field for indicating downlink beam information, a field for indicating uplink beam information, or any combination thereof.

23. The method of claim 19, further comprising:
transmitting, within the one or more first transmission configuration indicator state information or within the one or more second transmission configuration indicator state information, one or more quasi co-location information fields that indicate one or more source reference signals for quasi co-location assumptions for the two or more channels, or the reference signals, or any combination thereof.

24. The method of claim 23, wherein:
each source reference signal of the one or more source reference signals indicates one or more quasi co-location types, and
the one or more quasi co-location types are associated with a set of parameters comprising a Doppler shift, a Doppler spread, an average delay, a delay spread, a spatial reception parameter, uplink spatial relationship information for a spatial transmission parameter, an uplink Doppler shift, an uplink Doppler spread, an uplink average delay, an uplink delay spread, or any combination thereof.

25. The method of claim 19, further comprising:
transmitting, within the one or more first transmission configuration indicator state information, the respective set of uplink power control parameters associated with the two or more channels, or the reference signals, or any combination thereof, wherein the respective set of uplink power control parameters comprises a pathloss reference signal, a target receive power parameter, a pathloss compensation factor, a closed loop index, a power control group identity, or any combination thereof.

26. The method of claim 19, further comprising:
transmitting, within the one or more first transmission configuration indicator state information, a set of timing advance parameters associated with the plurality of uplink resources, wherein the set of timing advance parameters comprises a timing advance group identity, a timing advance value, or both.

27. The method of claim 19, further comprising:
transmitting, within the one or more first transmission configuration indicator state information, a set of parameters associated with codebook-based transmissions on the plurality of uplink resources, or non-codebook-based transmissions on the plurality of uplink resources, or both, wherein the set of parameters comprises a sounding reference signal resource indicator, a transmission precoding matrix indicator, a transmission rank indicator, or any combination thereof.

28. An apparatus for wireless communication at a user equipment (UE), comprising:
one or more processors;
one or more memories coupled with the one or more processors; and
instructions stored in the one or more memories and executable by the one or more processors to cause the apparatus to:
receive a message comprising one or more first transmission configuration indicator state information and one or more second transmission configuration indicator state information different from the one or more first transmission configuration indicator state information, wherein the one or more first transmission configuration indicator state information is associated with a plurality of uplink resources and wherein the one or more second transmission configuration indicator state information is associated with a plurality of downlink resources;

apply respective transmission configuration indicator states to each of two or more channels, or reference signals, or any combination thereof, the respective transmission configuration indicator states corresponding to the one or more first transmission configuration indicator state information or the one or more second transmission configuration indicator state information, wherein each transmission configuration indicator state indicates a respective beam for an uplink transmission and a respective set of power control parameters associated with the two or more channels, or the reference signals, or any combination thereof, and wherein a first subset of a set of timing advance parameters is applied to a first beam of the respective beams and a second subset of the set of timing advance parameters is applied to a second beam of the respective beams; and determine common beam information for the plurality of uplink resources or the plurality of downlink resources based at least in part on applying the respective transmission configuration indicator states to each of the two or more channels, or the reference signals, or any combination thereof.

29. The apparatus of claim 28, wherein the instructions are further executable by the one or more processors to cause the apparatus to:

identify the respective set of power control parameters associated with the two or more channels, or the reference signals, or any combination thereof, the respective set of power control parameters being identified within the one or more first transmission configuration indicator state information, wherein the respective set of power control parameters comprises a pathloss reference signal, a target receive power parameter, a pathloss compensation factor, a closed loop index, a power control group identity, or any combination thereof; and apply the respective set of power control parameters to an uplink transmission based at least in part on the respective transmission configuration indicator states.

30. An apparatus for wireless communication at a base station, comprising:

one or more processors;

one or more memories coupled with the one or more processors; and instructions stored in the one or more memories and executable by the one or more processors to cause the apparatus to:

determine common beam information for a plurality of uplink resources and a plurality of downlink resources;

configure two or more channels, or reference signals, or any combination thereof, to which respective transmission configuration indicator states are to be applied based at least in part on the common beam information, the two or more channels comprising two or more uplink channels indicated within one or more first transmission configuration indicator state information or two or more downlink channels indicated within one or more second transmission configuration indicator state information, wherein each transmission configuration indicator state indicates a respective beam for an uplink transmission and a respective set of power control parameters associated with the two or more channels, or the reference signals, or any combination thereof, and wherein a first subset of a set of timing advance parameters is applied to a first beam of the respective beams and a second subset of the set of timing advance parameters is applied to a second beam of the respective beams; and transmit, to a user equipment (UE), a message comprising the one or more first transmission configuration indicator state information and the one or more second transmission configuration indicator state information different from the one or more first transmission configuration indicator state information, wherein the one or more first transmission configuration indicator state information is associated with the plurality of uplink resources and wherein the one or more second transmission configuration indicator state information is associated with the plurality of downlink resources.

31. A user equipment (UE) for wireless communication, comprising:

one or more processors;

one or more memories coupled with the one or more processors; and instructions stored in the one or more memories and executable by the one or more processors cause the UE to:

receive a message comprising one or more first transmission configuration indicator state information and one or more second transmission configuration indicator state information different from the one or more first transmission configuration indicator state information, wherein the one or more first transmission configuration indicator state information is associated with a plurality of uplink resources and wherein the one or more second transmission configuration indicator state information is associated with a plurality of downlink resources;

apply respective transmission configuration indicator states to each of two or more channels, or reference signals, or any combination thereof, the respective transmission configuration indicator states corresponding to the one or more first transmission configuration indicator state information or the one or more second transmission configuration indicator state information, wherein the respective transmission configuration indicator states each indicate a set of power control parameters associated with the two or more channels, or the reference signals, or any combination thereof, and wherein different source reference signals are associated with quasi co-location assumptions for each of the two or more channels, or the reference signals, or any combination thereof, based at least in part on the respective transmission configuration indicator states;

determine common beam information for the plurality of uplink resources or the plurality of downlink resources based at least in part on applying the respective transmission configuration indicator states to each of the two or more channels, or the reference signals, or any combination thereof, the common beam information comprising a first beam and a second beam, the first beam corresponding to a first source reference signal and a first channel of the two or more channels or a first reference signal of the reference signals, and wherein the second beam corresponds to a second source reference signal and a second channel of the two or more channels or a second reference signal of the reference signals; and communicate with a network device over the two or more channels using the first beam and the second beam, wherein communicating with the network device comprises communicating with the network device over the first channel using the first beam and over the second channel using the second beam.

32. The UE of claim 31, wherein the instructions are executable by the one or more processors to cause the UE to:

identify the set of power control parameters associated with the two or more channels, or the reference signals, or any combination thereof, the set of power control parameters being identified within the one or more first transmission configuration indicator state information, wherein the set of power control parameters comprises a pathloss reference signal, a target receive power parameter, a pathloss compensation factor, a closed loop index, a power control group identity, or any combination thereof; and apply the set of power control parameters to an uplink transmission based at least in part on the respective transmission configuration indicator states.

33. The UE of claim 31, wherein the instructions are executable by the one or more processors to cause the UE to:

identify the respective transmission configuration indicator states based at least in part on an information field comprising respective transmission configuration indicator state identities corresponding to the respective transmission configuration indicator states, wherein the information field is within the one or more first transmission configuration indicator state information or within the one or more second transmission configuration indicator state information.

* * * * *